(12) United States Patent
Neiman et al.

(10) Patent No.: US 7,555,606 B2
(45) Date of Patent: *Jun. 30, 2009

(54) SYSTEM AND METHOD FOR CACHING RESULTS

(75) Inventors: Steven Neiman, Staten Island, NY (US); Roman Sulzhyk, New York, NY (US)

(73) Assignee: JP Morgan Chase & Co., New York, NY (US)

( * ) Notice: Subject to any disclaimer, the term of this patent is extended or adjusted under 35 U.S.C. 154(b) by 187 days.

This patent is subject to a terminal disclaimer.

(21) Appl. No.: 11/825,107

(22) Filed: Jul. 3, 2007

(65) Prior Publication Data

US 2008/0034160 A1 Feb. 7, 2008

Related U.S. Application Data

(60) Continuation of application No. 11/040,715, filed on Jan. 21, 2005, now Pat. No. 7,240,158, which is a division of application No. 10/177,497, filed on Jun. 21, 2002, now Pat. No. 6,895,472.

(51) Int. Cl.
*G06F 13/00* (2006.01)
*G06F 12/00* (2006.01)

(52) U.S. Cl. ............. 711/118; 711/148; 711/170; 709/213; 709/217

(58) Field of Classification Search .......... 711/118, 711/147, 148, 170; 709/213, 216, 217, 226
See application file for complete search history.

(56) References Cited

U.S. PATENT DOCUMENTS

| | | | |
|---|---|---|---|
| 5,031,089 A | 7/1991 | Liu et al. | |
| 5,201,043 A | 4/1993 | Crawford et al. | |
| 5,546,582 A | 8/1996 | Brockmeyer et al. | |
| 5,649,092 A | 7/1997 | Price et al. | |
| 5,996,054 A | 11/1999 | Ledain et al. | |
| 6,067,633 A | 5/2000 | Robbins et al. | |
| 6,088,758 A | 7/2000 | Kaufman et al. | |
| 6,112,023 A | 8/2000 | Dave et al. | |

(Continued)

OTHER PUBLICATIONS

New Architect Magazine; Lyman, J.; "Girding for the Grid, Distributed Computing's Big Break"; Apr. 2002.

(Continued)

*Primary Examiner*—Tuan V. Thai
(74) *Attorney, Agent, or Firm*—Milbank, Tweed, Hadley & McCloy LLP

(57) ABSTRACT

In certain aspects, the invention features a system and method for caching results, including receiving a job for computation by a distributed computing system having one or more node computing devices in communication with a cache, processing, on one of the node computing devices, the job to create an intermediate result for storage in the cache, wherein the intermediate result includes data wherein a time required to obtain the data by computation or retrieval from a data storage external to the distributed computer system is at least marginally greater than that of retrieving the intermediate result from the cache. In accordance with such aspects, the system and method further includes storing the intermediate result in the cache, and accessing the cache by presenting a lookup function to the cache, wherein the lookup function includes a key and a compute function configured to produce the intermediate result.

16 Claims, 13 Drawing Sheets

U.S. PATENT DOCUMENTS

| | | | |
|---|---|---|---|
| 6,128,709 | A | 10/2000 | Autechaud et al. |
| 6,202,125 | B1 | 3/2001 | Patterson et al. |
| 6,253,273 | B1 | 6/2001 | Blumenau |
| 6,345,294 | B1 | 2/2002 | O'Toole et al. |
| 6,400,726 | B1 | 6/2002 | Piret et al. |
| 6,463,511 | B2 * | 10/2002 | Boatright et al. ............ 711/145 |
| 6,501,871 | B1 | 12/2002 | Sucharczuk et al. |
| 6,625,636 | B1 | 9/2003 | Skovira |
| 6,751,721 | B1 * | 6/2004 | Webb et al. ................... 712/10 |
| 6,766,424 | B1 * | 7/2004 | Wilson ....................... 711/148 |
| 6,950,945 | B2 | 9/2005 | Pfister et al. |
| 7,003,587 | B1 | 2/2006 | Battat et al. |
| 7,010,607 | B1 | 3/2006 | Bunton |
| 7,047,299 | B1 | 5/2006 | Curtis |
| 2002/0004917 | A1 | 1/2002 | Malcolm et al. |
| 2002/0052956 | A1 | 5/2002 | Seibold et al. |
| 2002/0062376 | A1 | 5/2002 | Isoyama |
| 2002/0078299 | A1 | 6/2002 | Chiou et al. |
| 2002/0143945 | A1 | 10/2002 | Shahabuddin et al. |
| 2002/0174316 | A1 | 11/2002 | Dale et al. |
| 2002/0184446 | A1 | 12/2002 | Kagan et al. |
| 2003/0033402 | A1 | 2/2003 | Battat et al. |
| 2003/0041280 | A1 | 2/2003 | Malcolm et al. |
| 2003/0093467 | A1 | 5/2003 | Anderson |
| 2003/0093627 | A1 | 5/2003 | Neal et al. |

OTHER PUBLICATIONS

Foster, I.; "1.1 Parallelism and Computing"; 1995.
Foster, I.; "1.2 A Parallel Machine Model"; 1995.
Foster, I.; "1.3 A Parallel Programming Model"; 1995.
Foster, I.; "1.4 Parallel Algorithm Examples"; 1995.
Foster, I.; "1.5 Summary"; 1995.
Foster, I.; "2 Designing Parallel Algorithms"; 1995.
Foster, I.; "2.1 Methodical Design"; 1995.
www.IDevResource.com, EJB Transactions and JTS; Raj, G.; "Transactions, 2PC and JTS"; Jan. 2000.
www.IDevResource.com, Raj, G.; "EJB Servers"; Jan. 2000.
www.IDevResource.com, Raj, G.; "EJB Containers"; Jan. 2000.
www.IDevResource.com, Raj, Gopalan Suresh; "EJB Components", Jan. 2000.
www.IDevResource.com; Raj, G.; "EJB Session Beans"; Jan. 2000.
www.IDevResource.com; Raj, G.; "EJB Entity Beans"; Jan. 2000.
www.IDevResource.com; Raj, G.; "EJB Components at the Server"; Jan. 2000.
www.IDevResource.com; Raj, G.; "Enterprise Java Beans"; Jan. 2000.
Technology Review; Waldrop, M., "Grid Computing"; May 2002.
IEEE; Foster, I., et al.; "Grid Services for Distributed System Integration"; Jun. 2002.
Intl J. Supercomputer Applications; Foster, I., et al., "The Anatomy of a Grid, Enabling Scalable Virtual Organizations"; 2001.
Chervenak, A., et al., "The Data Grid: Towards an Architecture for the Distributed Management and Analysis of Large Scientific Datasets".
The Grid: Blueprint for a Future Computing Infrastructure, Foster, I., et al., "Computational Grids", 1998.
IEEE, Chervenak, A., et al.; "Giggle: A Framework for Constructing Scalable Replica Location Services"; 2002.
Allcock, B., et al.; "Data Management and Transfer in High Performance Computational Grid Environments".
Stockiner, H., et al.; "File and Object Replication in Data Grids".
Ripeanu, M., et al.; "A Decentralized, Adaptive Replica Location Mechanism".
Vazhkudai, S., et al.; "Using Disk Throughput Data in Predictions of End-to-End Grid Data Transfers".
GridForum Draft; Allcock, W., et al.; "GridFTP: Protocol Extensions to FTP for the Grid"; Apr. 2002.
GridFTP Update; "GridFTP Update Jan. 2002"; 2002.
Ranganathan, K., et al.; "Decoupling Computation and Data Scheduling in Distributed Data-Intensive Applications".
Ranganathan, K., et al.; "Improving Data Availability through Dynamic Model-Driven Replication in Large Peer-to-Peer Communities".
Foster, I., et al.; "Chimera: A Virtual Data System for Representing, Querying, and Automating Data Derivation".
IEEE; Annis, J., et al.; "Applying Chimera Virtual Data Concepts to Cluster Finding in the Sloan Sky Survey"; 2002.
Ranganathan, K., et al.; "Identifying Dynamic Replication Strategies for High Performance Data Grid".
Iamnitchi, A., et al., "Locating Data in (Small-World?) Peer-to-Peer Scientific Collaborations".
Vazhkudai, S., et al.; "Predicting the Performance of Wide Area Data Transfers".
Allcock, W., et al.; "Globus Toolkit Support for Distributed Data-Intensive Science".
Lee, J., et al.; "Applied Techniques for High Bandwidth Data Transfers Across Wide Area Networks".
Ranganathan, K., et al.; "Design and Evaluation of Dynamic Replication Strategies for a High-Performance Data Grid".
Proc. 10th Intl Symp. on High Performance Distributed Computer; Stockinger, H., et al.; "File and Object Replication in Data Grids"; 2001.
Vazhkudai, S., et al.; "Replica Selection in the Globus Data Grid".
Allcock, W., et al.; "Secure, Efficient Data Transport and Replica Management for High-Performance Data-Intensive Computer".
Allcock, W.; "Protocols and Services for Distributed Data-Intensive Science".
Bresnahan, J., et al.; "Communication Services for Advanced Network Applications".
Keahey, K., et al.; "Fine-Grain Authorization Policies in the Grid: Design and Implementation".
JSSPP; Czajkowski, K., et al.; "SNAP: A Protocol for Negotiating Service Level Agreements and Coordinating Research Management Data in Distributed Systems"; 2002.
Kennedy, K., et al.; "Toward a Framework for Preparing and Executing Adaptive Grid Programs".
Liu, C., et al.; "Design and Evaluation of a Resource Selection Framework for Grid Applications".
Iamnitchi, A., et al.; "On Fully Decentralized Resource Discovery in Grid Environments".
Frey, J., et al.; "Condor-G: A Computation Management Agent for Multi-Institutional Grids".
Proc. of the 10th IEEE Symp. on High Performance Distributed Computing; Czajkowski, K., et al.; "Practical Resource Management for Grid-based Visual Exploration"; 2001.
Proc. of the 10th IEEE Symp. on High Performance Distributed Computing; Sander, V. et al.; "End-to-End Provision of Policy Information for Network Qos"; Aug. 2001.
Iamnitchi, A.; "A Problem Specific Fault-Tolerance Mechanism for Asynchronous, Distributed Systems".
Proc. of the Eighth International Workshop on Quality of Service; Foster, I., et al.; "A Quality of Service Architecture that Combines Resource Reservation and Application Adaption"; Jun. 2000.
Sander, V., et al.; "A Differentiated Service Implementation for High-Performance TCP Flows".
Smith, W., et al.; "Scheduling with Advanced Reservations".
Smith, W., et al.;"Using Run-Time Predictions to Estimate Queue Wait Times and Improve Scheduler Performance".
Czajkowski, K., et al.; "Resource Co-Allocation in Computational Grids".
Foster, I., et al.; "End-To-End Quality of Service for High-End Applications".
Hoo, G., et al.; "QoS as Middleware: Bandwidth Reservation System Design".
Lee, C., et al.; "A Network Performance Tool for Grid Environments".
Foster, I., et al., "A Distributed Resource Management Architecture that Supports Advance Reservations and Co-Allocation".
Proc. 10th IEEE International Symposium on High Performance Distributed Computing (HPDC-10); Czajkowski, K., et al.; "Grid Information Services for Distributed Resource Sharing"; 2001.
Welch, V., et al.; "Security for Grid Services".

Keahey, K., et al.; "Fine-Grain Authorization for Resource Management in the Grid Environment".

Pearlman, L., et al.; "A Community Authorization Service for Group Collaboration".

Computer; Butler, R., et al., "A National-Scale Authentication Infrastructure"; 2000.

Allcock, W., et al.; "GridMapper: A Tool for Visualizing the Behavior of Large-Scale Distributed Systems".

Foster, I., et al.; "Distance Visualization: Data Exploration on the Grid".

von Laszewski, G., et al.; "Designing Grid-based Problem Solving Environments and Portals".

von Laszewski, G., et al.; "A Java Commodity Grid Kit"; Nov. 2000.

von Laszewski, G., et al.; "CoG Kits: A Bridge Beteen Commodity Distributed Computing and High Performance Grids".

Proceedings of the IEEE/ACM SC2000 Conference; Roy, A., et al.; "MPICH-GQ: Quality-of-Service for Message Passing Programs"; Nov. 2000.

Karonis, N., et al.; "Exploiting Hierarchy in Parallel Computer Networks to Optimize Collective Operation Performance".

Foster, I., et al.; "A Grid-Enable MPI: Message Passing Heterogeneous Distributed Computing Systems".

Foster, I., et al.; "A Secure Communications Infrastructure for High Performance Distributed Computing".

Keahey, K., et al.; "Computational Grids in Action: The National Fusion Collaboratory".

Russell, M., et al.; "The Astrophysics Simulation Collaboratory: A Science Portal Enabling Community Software Development".

Allen, G., et al., "The Cactus Worm: Experiments with Dynamic Resource Discovery and Allocation in a Grid Environment".

Ripeanu, M., et al.; "Performance Predictions for a Numerical Relativity Package in Grid Environments".

Ripeanu, M., et al.; "Cactus Application: Performance Predictions in Grid Environments".

Association for Computing Machinery; Allen, G., et al., "Supporting Efficient Execution in Heterogeneous Distributed Computing Environments with Cactus and Globus"; Nov. 2001.

ACM; Allcock, W., et al.; "High-Performance Remote Access to Climate Simulation Data: A Challenge Problem for Data Grid Technologies"; Nov. 2001.

Review of Scientific Instruments; Wang, Y.; "A High-throughput X-ray Microtomography System at the Advance Photon Sources"; Apr. 2001.

Allen, G., et al.; "Cactus-G: Enabling High-Performance Simulation in Heterogeneous Distributed Computing Environments"; May 2000.

Proceedings of the IEEE Virtual Reality 2000 International Conference; Leigh, J., et al.; "A Review of Tele-Immersive Applications in the CAVE Research Network"; 1999.

Benger, W., et al.; "Numerical Relativity in a Distributed Environment".

Barnard, S., et al.; "Large-Scale Distributed Computational Fluid Dynamics on the Information Power Grid using Globus".

Brown, M., et al.; "The International Grid (iGrid): Empowering Global Research Community Network using High Performance International Internet Services".

von Laszewski, G., et al.; "Real-Time Analysis, Visualization, and Steering of Microtomography Experiments at Photon Sources".

DeFanti, T., et al.; "Overview of the I-WAY: Wide Area Visual Supercomputing".

Yang, L., et al; "Homeostatic and Tendency-based CPU Load Predictions".

Ripeanu, M. et al.; "Mapping the Gnutella Network: Properties of Large-Scale Peer-to-Peer Systems and Implications for System Designs".

Ripeanu, M., et al.; "Mapping the Gnutella Network: Macroscopic Properties of Large-Scale Peer-to-Peer Systems".

Ripeanu, M.; "Peer-to-Peer Architecture Case Study: Gnutella Network".

Stelling, P., et al.; "A Fault Detection Service for Wide Area Distributed Computations".

Novotny, J., et al.; "An Online Credential Respository for the Grid: My Proxy".

Physics Today; Foster, I., "The Grid: A New Infrastructure for 21st Century Science"; Feb. 2002.

\* cited by examiner

SYSTEM AND METHOD FOR CACHING RESULTS

CROSS-REFERENCE TO RELATED APPLICATIONS

This application is a continuation of application Ser. No. 11/040,715, filed Jan. 21, 2005, now U.S. Pat. No. 7,240,158, which is a divisional of application Ser. No. 10/177,497, filed Jun. 21, 2002, now U.S. Pat. No. 6,895,472; the entirety of the foregoing related applications and patents are incorporated by reference herein.

BACKGROUND

I. Field of the Invention

The present invention relates to the structure and operation of computing systems, and more particularly, to distributed computing systems and methods of operating such systems.

II. Description of the Related Art

Certain organizations have a need for high performance computing resources. For example, a financial institution may use such resources to perform risk management modeling of the valuations for particular instruments and portfolios at specified states of the world. As another example, a pharmaceutical manufacturer may use high performance computing resources to model the effects, efficacy and/or interactions of new drugs it is developing. As a further example, an oil exploration company may evaluate seismic information using high performance computing resources.

One conventional computing system includes a mainframe computer attached to an individual user terminal by a network connection. Using the terminal, a user may instruct the mainframe computer to execute a command. In this conventional system, almost all data storage and processing functionality resides on the mainframe computer, while relatively little memory or processing capability exists at the terminal. This terminal/mainframe architecture may not, however, allow computations requested by a user to be computed rapidly or automatically.

The open systems interconnection (OSI) model describes one conceptual network architecture represented by seven functional layers. In this model, the functions of a networking system in a data communications network are reflected as a set of seven layers, including a physical layer, data link layer, network layer, transport layer, session layer, presentation layer and application layer. One or more entities within each layer implement the functionality of the layer. Each entity provides facilities for use only by the layer above it, and interacts directly only with the layer below it. FIG. 1 depicts the seven functional layers of the OSI model.

The physical layer describes the physical characteristics of hardware components used to form a network. For example, the size of cable, the type of connector, and the method of termination are defined in the physical layer.

The data link layer describes the organization of the data to be transmitted over the particular mechanical/electrical/optical devices described in the physical layer. For example, the framing, addressing and check summing of Ethernet packets is defined in the data link layer.

The network layer describes how data is physically routed and exchanged along a path for delivery from one node of a network to another. For example, the addressing and routing structure of the network is defined in this layer.

The transport layer describes means used to ensure that data is delivered from place to place in a sequential, error-free, and robust (i.e., no losses or duplications) condition. The complexity of the transport protocol is defined by the transport layer.

The session layer involves the organization of data generated by processes running on multiple nodes of a network in order to establish, use and terminate a connection between those nodes. For example, the session layer describes how security, name recognition and logging functions are to take place to allow a connection to be established, used and terminated.

The presentation layer describes the format the data presented to the application layer must possess. This layer translates data from the format it possesses at the sending/receiving station of the network node to the format it must embody to be used by the application layer.

The application layer describes the service made available to the user of the network node in order to perform a particular function the user wants to have performed. For example, the application layer implements electronic messaging (such as "e-mail") or remote file access.

In certain conventional high performance computing systems designed using the OSI model, the hardware used for computation-intensive processing may be dedicated to only one long-running program and, accordingly, may not be accessible by other long running programs. Moreover, it may be difficult to easily and dynamically reallocate the computation-intensive processing from one long running program to another. In the event processing resources are to be reallocated, a program currently running on a conventional high performance computer system typically must be terminated and re-run in its entirety at a later time.

SUMMARY OF THE INVENTION

In one aspect, the invention features a method including receiving a job for computation by a distributed computing system having one or more node computing devices in communication with a cache, processing, on one of the node computing devices, the job to create an intermediate result for storage in the cache, wherein the intermediate result includes data wherein a time required to obtain the data by computation or retrieval from a data storage external to the distributed computer system is at least marginally greater than that of retrieving the intermediate result from the cache. In accordance with such an aspect, the method further includes storing the intermediate result in the cache, and accessing the cache by presenting a lookup function to the cache, wherein the lookup function includes a key and a compute function configured to produce the intermediate result.

In another aspect, the invention features a distributed computing system including one or more node computing devices in communication with a cache, means for receiving a job for computation by the distributed computing system, means for processing, on one of the node computing devices, the job to create an intermediate result for storage in the cache, wherein the intermediate result includes data wherein a time required to obtain the data by computation or retrieval from a data storage external to the distributed computer system is at least marginally greater than that of retrieving the intermediate result from the cache. According to such an aspect, the system further includes means for storing the intermediate result in the cache, and means for accessing the cache by presenting a lookup function to the cache, wherein the lookup function includes a key and a compute function configured to produce the intermediate result.

BRIEF DESCRIPTION OF THE DRAWINGS

Features and other aspects of the invention are explained in the following description taken in conjunction with the accompanying drawings, wherein.

It is to be understood that the drawings are exemplary, and are not limiting.

DETAILED DESCRIPTION OF PREFERRED EMBODIMENTS

Various embodiments of the present invention will now be described in greater detail with reference to the drawings.

I. System Embodiments of the Invention

Figure 1:
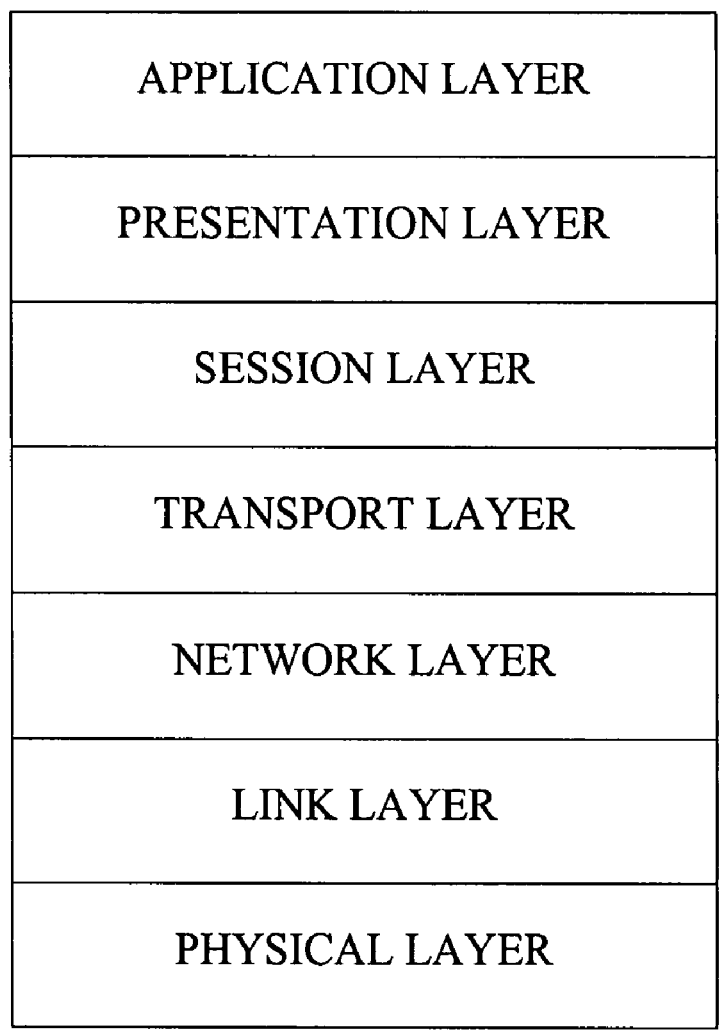
FIG. 1 depicts the seven functional layers of the open systems interconnection (OSI) model.
Figure 2:
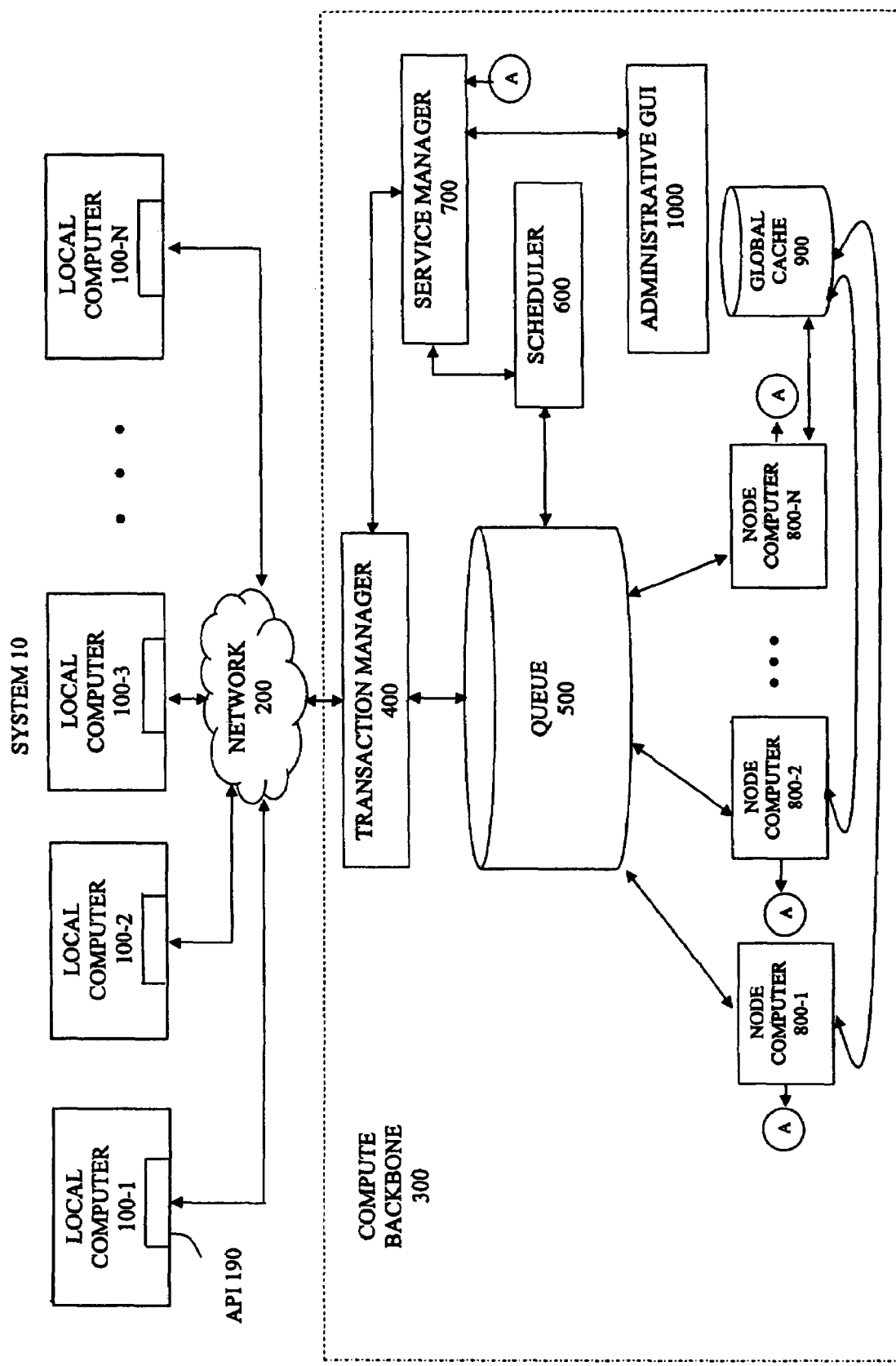
FIG. 2 illustrates a system 10 including a compute backbone 300 according to one embodiment of the present invention.

FIG. 2 illustrates certain components of one embodiment of a system 10 of the present invention, which may generally include a number of local computers 100-1 to 100-N in communication, via a network 200, with a compute backbone 300.

A function of this embodiment of the system 10 is to service parametric computation requests of various users 20 or groups of users. In particular, such a system 10 may allow each user 20 access to a service on a common infrastructure for performing compute dense calculations by dynamically allocating a portion of the compute backbone 300 infrastructure to the user 20 for processing of each user's 20 distinct application. A system 10 of one embodiment may include software that allows compute intensive applications to queue, schedule and prioritize their calculations on the infrastructure. In addition, the infrastructure and software of such an embodiment may operate to manage resource allocation, authentication, job distribution, data flow and fault tolerance. In accordance with this system 10, distinct applications may each connect to the compute backbone 300 infrastructure, which may perform several operations including prioritizing compute requests from the applications according to a policy (predetermined or otherwise), allocating hardware and software resources, assigning compute requests to a proper computation resource, and returning results to the applications.

A. Local Computer 100

Figure 3:
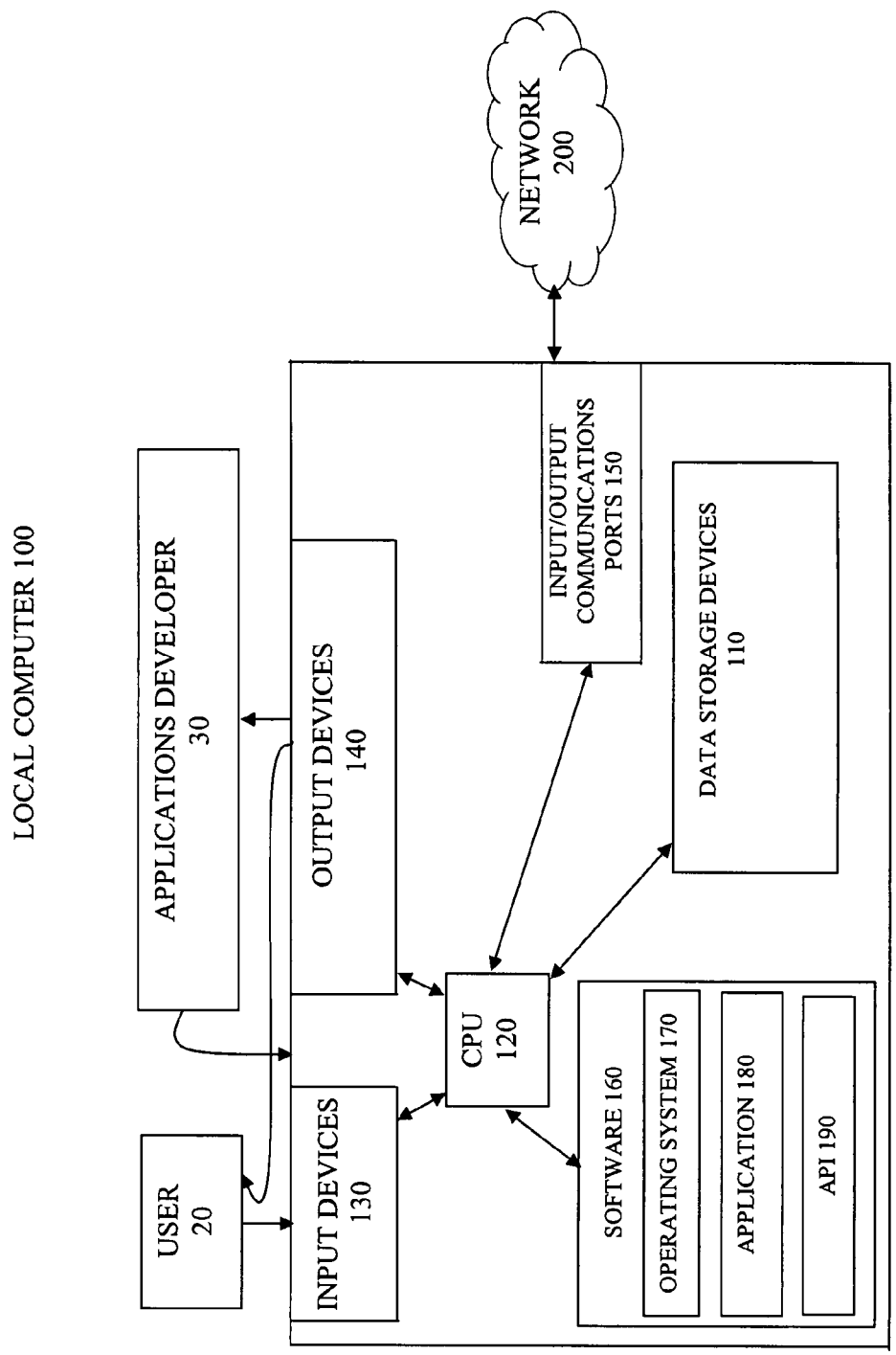
FIG. 3 illustrates certain components of one embodiment of a local computer 100 of the system 10 shown in FIG. 2.

In the embodiment depicted in FIGS. 2 and 3, each local computer 100 may generally include one or more data storage devices 110, a central processing unit (CPU) 120, one or more input devices 130, one or more output devices 140, input/output (I/O) communications ports 150, and other hardware components (not shown) which facilitate performance of the functions of the local computer 100 and/or the system 10 as described herein. In one embodiment, the hardware devices of a local computer 100 may be in communication with one another by a shared data bus and/or by dedicated connections (not shown). In addition, a number of software components 160 may run on each local computer 100.

A local computer 100-1 of one embodiment may be, for example, a shared memory multiprocessor machine made by Sun Microsystems configured to run programs created using the Smalltalk programming language. Another embodiment of a local computer 100-2 may be an IBM machine running programs created using the C programming language. Yet another embodiment of a local computer 100-3 may be an SGI machine running programs using the C++ and/or Java programming languages. A further embodiment of a local computer 100-4 may include a composition of a number of separate devices.

The data storage devices 110 of one embodiment may include one or more hard disk drives. However, it is to be understood that data storage devices 110 such as RAM, ROM, CD-ROM, DVD-ROM, solid state drive, floppy disk-drive or combinations thereof may also be included in the embodiment shown in FIG. 3, or in certain other appropriate embodiments. One embodiment of a local computer 100-1 may include input device(s) 130 (e.g., keyboard, pointing/selecting device such as a mouse or track ball, floppy disk-drive, scanner and/or touch screen interface) that may enable a user 20 and/or applications developer 30 of the system 10 to provide information and instructions for storage in the local computer 100 and use in operation of the system 10. An embodiment of a local computer 100-1 may also include output devices 140 (e.g., printer, display device, floppy disk-drive and/or computer monitor) that may enable a user 20 and/or applications developer 30 to receive, for further manipulation and/or storage, information generated using the local computer 100 and/or the system 10. The I/O communications ports 150 of a local computer 100-1 of one embodiment may be serial and parallel, and may be configured to include multiple communications channels for simultaneous connections. The software components 160 may include an operating system 170 (e.g., Linux, Unix, Microsoft Windows NT), one or more user interface tools 175, calling applications 180, and an application program interface (API) 190. One embodiment of the system 10 may include ten or more local computers 100-1 to 100-N.

i. Calling Application 180

In one embodiment, a calling application 180 may be a computer program that contains logic to achieve or produce an outcome for a user 20. The software architecture of certain applications may conceptually consist of four layers: user interface and ad hoc calculation tools; logic; persistence; and high performance computing. The user 20 may send certain computation intensive portions of a particular calling application 180 (i.e., the high performance computing layer) to the compute backbone 300 for processing rather than have the local computer 100 process those computation intensive portions. In accordance with one embodiment, the user 20 may do so by (i) creating one or more worker modules 195-1 to 195-N (e.g., shared libraries, executable files compliant with a compute backbone 300, Java archive files and/or other archive files), each of which contains one or more compute functions or engines called "workers" 155-1 to 155-N, (ii) deploying the worker modules 195-1 to 195-N on the compute backbone 300, and (iii) sending to the compute backbone 300 a job 182 that requests the compute backbone 300 to perform a computation using a worker 155 contained in a worker module 195 that has been deployed on the compute backbone 300. A worker 155 may be constructed to conform to and operate with the API 190, and may conceptually "plug" into the infrastructure of the compute backbone 300 (in particular, to the launcher 880 as described below in section v.). A compute function may be implemented in a number of ways including, without limitation, as a function, as a class method or as an executable constructed to be compatible with the compute backbone 300. In accordance with one embodiment, a worker 155 may be capable of staying initialized after completing a computation in order to handle additional compute requests should the scheduler 600 send such requests to the node computer 800 on which the worker 155 is invoked.

According to one embodiment, a worker 155 may be capable of computing tasks 186-1 to 186-N once loaded onto the compute backbone 300. For example, a worker 155 may be a function that takes task inputs and returns a task output or an error indication. Furthermore, a worker 155 may itself create a job 182 and schedule tasks 186-1 to 186-N with the compute backbone 300, thereby further subdividing computations to be performed.

A job 182 may be conceptualized as a means for opening or establishing a computation session with the infrastructure of the compute backbone 300. In one embodiment, a job 182 may include and supply to the compute backbone 300 certain defining requirements or parameters for a computation session. In particular, one embodiment of a job 182 may include meta-information, such as an identification of a particular worker 155 to be used with the job. In one embodiment, meta-information supplied by a job 182 identifies only one worker 155 such that all jobs 182-1 to 182-N on the compute backbone may have a generally homogeneous format. In another embodiment, meta-information supplied by a job 182 may identify more than one worker 155-1 to 155-N.

Other optional meta-information may include information about the priority of the job 182 in relation to other jobs, a specification of minimal hardware requirements (e.g., minimum RAM and/or CPU power) for the job 182, a specification of a minimum number of nodes to be allocated in order for the particular job 182 to be run properly or efficiently, the amount of debugging information the job 182 is to provide while it is running, and task logic to control sequencing and control of task computation (e.g., fail all tasks if one task fails, one task is dependent upon another task).

According to one embodiment, certain meta-information may be changed while a job 182 is running. For example, the priority of the job 182 may be adjusted by a user 20 without terminating or suspending the job 182. As another example, a user 20 may modify the amount of debugging information the job is to provide while it is running.

In one embodiment, a job 182 may also contain one or more tasks 186 and inputs which collectively represent a unit of computational work to be performed by a processor. Such inputs may include optional global data. A particular worker 155 of a worker module 195 deployed on the compute backbone 300 may perform each task 186-1 to 186-N. Global data and task inputs 187-1 to 187-N may combine to represent the inputs to a particular computation. For example, a job 182 may be defined to compute the value of a number of financial instruments based on the market conditions at closing time on a particular trading day. A user 20 may configure the job 182 such that the global data for the job 182 defines the market conditions at closing, and each instrument may be represented by a separate task 186. In such a case, the task inputs 187-1 to 187-N and global data would be supplied to generate task output 189. However, inputs (e.g., global data and/or task inputs 187-1 to 187-N) need not be provided to a job 182 at the time the job 182 is created. In addition, tasks 186-1 to 186-N need not be supplied at the time of job 182 creation. A job 182 also may have a dynamic collection of one or more tasks 186-1 to 186-N.

A task 186 may be an encapsulation of a single computation to be performed by the compute backbone 300. A task 186 has an input object 187 (i.e., the input needed for a calculation), and on success it will have an output object or an error indication 189. At any point in time a task 186 also has a state 188, such as an indication of whether the task 186 has been completed or not (e.g., queued, running, completed, rescheduled, suspended, or error), and produce log data as generated by the worker 155. In accordance with one embodiment, a worker 155 on the compute backbone 300 loads a worker module 195, performs a requested computation, and creates task output 189. In one embodiment, a task 186 typically may be completed in two seconds or less, and perhaps in 100 milliseconds or less.

In one embodiment, calling applications 180-1 to 180-N running on the local computers 100-1 to 100-N are programmed to interface with the compute backbone 300. In particular, a calling application 180 running on a particular local computer 100 is compatible with the API 190 also running on that local computer 100. For example, a calling application 180 created in C programming language may be compatible with the C language API 190 running on a particular local computer 100. In such an example, a portion of the API 190 may communicate with both the calling application 180 and the compute backbone 300 in the following manner. First, a calling application 180 may send a request, in C language, for something to be done by the compute backbone 300 (e.g., a request for a computation to be performed or for a result to be retrieved). The API 190 may translate the C language request into, for example, a language independent protocol such as an XML/HTTP protocol request, and then send it to the compute backbone 300, which in turn processes the request from the calling application 180.

ii. Application Program Interface 190

According to one embodiment, an object oriented API 190 residing on a local computer 100 provides an interface between a calling application 180 and the compute backbone 300. Such an API 190 may use a transparent communication protocol (e.g., SOAP, XML/HTTP or its variants) to provide communication between calling applications 180-1 to 180-N and the compute backbone 300 infrastructure. The API 190 of one embodiment interacts with the transaction manager 400 to authenticate requests from calling applications 180-1 to 180-N for access to the resources of the compute backbone 300.

Each API 190 contains a minimal but complete set of operations (to be performed by the compute backbone 300) that supports the job logic of the particular calling application 180, as well as the communication patterns of the local computer 100 on which the calling application 180 is running, such that the API 190 can send computation inputs and retrieve results. Each API 190 has a client 183 embedded in the calling application 180. The client 183 communicates with the compute backbone 300. Each API 190 also includes a managed service component 198 that implements resource allocation, fault tolerance, user acceptance testing (UAT), and release control functions.

The APIs 190-1 to 190-N shown in FIG. 2 need not all be compatible with the same programming language. For example, one API 190-1 may be compatible with C programming language, while another API 190-2 is compatible with C++ programming language, while yet another 190-3 is compatible with Java programming language.

The API 190 assists a calling application 180 in finding and accessing a compute function contained in a worker module 190 deployed on the compute backbone 300. In particular, the API 190 provides an agent or proxy responsible for performing computations on the compute backbone 300, i.e. a worker 155, and defines the way the computation inputs and outputs are to be communicated. The API 190 also allows users 20-1 to 20-N (i) to schedule jobs 182-1 to 182-N (which are associated with a particular calling application 180) with a worker 155 that resides on an available node computer 800 of the compute backbone 300, (ii) to query and modify the status and priority of the jobs 182-1 to 182-N, and (iii) to terminate running jobs 182-1 to 182-N. The API 190 may also provide workers 155-1 to 155-N with access to global cache 900 (i.e., persistent storage) such that the workers 155-1 to 155-N may share intermediate computational results. Furthermore, the API 190 may schedule tasks 186-1 to 186-N synchronously or asynchronously to allow a calling application 180 to either wait for a computation to complete before continuing, or to continue and then poll for results at a later time. An API 190 of one embodiment may also facilitate the connection of separate calling applications 180-1 to 180-2 to a job 182 (e.g., one calling application 180-1 may submit inputs to a job 182 while another calling application 182-2 handles retrieval of results from the job 182).

An API 190 according to one embodiment may also facilitate workers 155 themselves becoming clients of the compute backbone 300 to further decompose a particular computation request. For example, an API 190 running on a particular local computer 100 may send a request to the compute backbone 300 to compute the value of a portfolio of instruments. That API 190 may facilitate decomposition of the request into a number of separate requests which each value one instrument of the portfolio. After the value of each instrument is computed, the compute backbone 300 collects the results for delivery back to the local computer 100.

One embodiment of the API 190 is capable of operating in one of two modes: "network" mode or "local" mode. In local mode, the API 190 simulates the compute backbone 300 on a local computer 100 as a closed environment. In such a mode of operation, the API 190 initializes a worker module 195 containing a worker 155 in the same process space as the job 182 making the request (i.e., on the local computer 100 in which the particular API 190 and calling application 180 reside), rather than on a node computer 800 separated from the local computer 100 by, among other things, a network 200. In local mode, the API 190 makes all of the functions performed by the compute backbone 300 (e.g., scheduling, global caching, etc.) available to the worker 155 as if the worker 155 were being run on the compute backbone 300. In this embodiment, the API 190 in local mode emulates to the calling application 180 all of the functions of the compute backbone 300. Such a local mode of operation may allow a user 20 and/or applications developer 30 to debug the worker modules 195-1 to 195-N and jobs 182-1 to 182-N it creates, as well as perform regression and other testing and debugging in a local environment. Such a feature may form the basis for a contractual service level agreement between a client organization and an administrator for the compute backbone 300.

In the event a calling application 180 may not be functioning properly when run with the compute backbone 300 infrastructure, a user 20 and/or applications developer 30 may use local mode operation according to one embodiment to isolate the source of the error. In particular, a user 20 and/or applications developer 30 may operate a debugging tool on the local computer 100. Moreover, a user 20 and/or applications developer 30 may use local mode operation according to one embodiment to verify that the compute backbone 300 is performing the functions and delivering the level of service the user 20 and/or applications developer 30 expects.

B. Network 200

In the embodiment depicted in FIG. 2, the network 200 is a local area network (LAN). Although the network 200 of the embodiment shown in FIG. 2 is a single LAN, in alternative embodiments, connections between local computers 100-1 to 100-N and the compute backbone 300 may be of different types, including a connection over a telephone line, a direct connection, an Internet, a wide area network (WAN), an intranet or other network or combination of the aforementioned connections that is capable of communicating data between hardware and/or software devices. The network of the embodiment shown in FIG. 2 may have a minimum data transfer rate of 100 megabytes per second (MBps), and an optimal data transfer rate of greater than 1 GBps. More than one local computer 100-1 to 100-N at a time may communicate with the compute backbone 300 over the network 200.

In one embodiment, communication over the network 200 between a particular local computer 100 and the compute backbone 300 may be accomplished using a communications protocol such as XML/HTTP, simple object access protocol (SOAP), XMLRPC, transfer control protocol/internet protocol (TCP/IP), file transfer protocol (FTP), or other suitable protocol or combination of protocols.

Using the network 200, a local computer 100 may request information from the compute backbone 300 (in particular, the transaction manager 400, described below) by sending a request in a particular communication protocol (e.g., a hypertext transfer protocol (HTTP) request). For example, a local computer 100 shown in FIG. 3 may request access to the compute backbone 300 to process a job 182. When the local computer 100 contacts the transaction manager 400 (which, in one embodiment, is a server) of the compute backbone 300, the local computer 100 asks the transaction manager 400 for information (e.g., a file of computation results) by building a message with a compatible language and sending it. After processing the request, the transaction manager 400 sends the requested information to the local computer 100 in the form of the particular communication protocol. Software 160 running on the local computer 100 may then interpret the information sent by the transaction manager 400 and provide it to the user 20 (e.g., display it on an output device 140 such as a computer monitor). In one embodiment, the transaction manager 400 may communicate with a local computer 100 using a secure protocol (e.g., secure socket layer (SSL)).

C. Compute Backbone 300

According to one embodiment, the compute backbone 300 and a corresponding API 190 enables a number of users 20-1 to 20-N each running, for example, a number of different and completely independent calling applications to be processed dynamically on a single pool of distributed processing resources. Such an embodiment of the compute backbone 300 may collect computation requests from calling applications 180-1 to 180-N, invoke those requests on appropriate compute functions or engines (i.e., workers 155-1 to 155-N), assemble results, and return those results to the invoking calling applications 180-1 to 180-N.

As shown in FIG. 2, one embodiment of the compute backbone 300 generally includes a transaction manager 400, a central queue 500, a scheduler 600, a service manager 700, a number of node computers 800-1 to 800-N and a global cache 900. As depicted, the compute backbone 300 further includes user interface tools, including an administrative general user interface (GUI) 1000, which allows a user 20 and/or applications developer 30 to monitor and troubleshoot operations of the compute backbone 300. The compute backbone 300 of one embodiment is flexible enough to allow a request for computation resources equivalent to hundreds of CPUs to be satisfied within minutes. In addition, such a compute backbone 300 may be capable of sustaining input/output data rates sufficient to allow the loading of a global cache 900 of, for example, 250 megabytes (MB) within approximately ten seconds.

i. Transaction Manager 400

Figure 4:
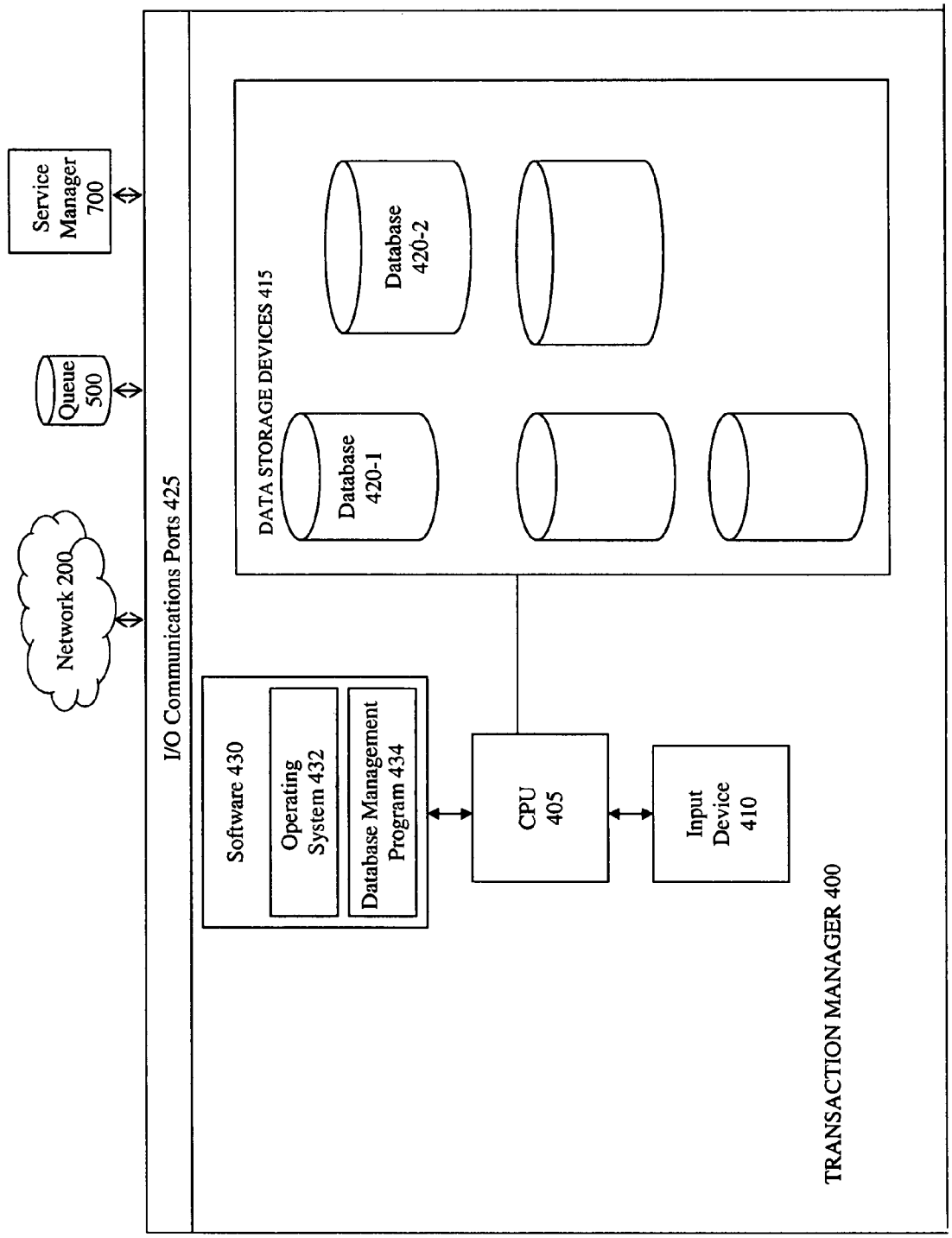
FIG. 4 illustrates certain components of one embodiment of a transaction manager 400 of the system 10 shown in FIG. 2.

The transaction manager 400 shown in FIGS. 2 and 4 is a gateway to the compute backbone 300. As such, the transaction manager 400 supports multiple types of messaging protocols to enable communication between itself and various types of local computers 100-1 to 100-N running different calling applications 180 created in different programming languages. Using the API. 190, the transaction manager 400 also guarantees delivery of a compute request from a particular calling application 180 on a local computer 100, and performs some transactional queue management.

In one embodiment, all communications between a local computer 100 and the transaction manager 400 are secure and involve an authentication process before access to the compute backbone 300 is granted. Such authentication assists the compute backbone 300 (in particular, the service manager 700 and administrative GUI 1000, discussed below) in generating accurate billing information detailing a particular user's 20 usage of the resources of the compute backbone 300, and also helps to prevent unauthorized access to the compute backbone 300.

FIG. 4 is a block diagram showing certain components of a transaction manager 400 according to one embodiment of the present invention. As FIG. 4 illustrates, the transaction manager 400 of one embodiment is a server having a central processing unit (CPU) 405 that is in communication with a number of components by a shared data bus or by dedicated connections—these components include one or more input devices 410 (e.g., a CD-ROM drive and/or tape drive) which enable information and instructions to be input for storage in the transaction manager 400, one or more data storage devices 415, having one or more databases 420 defined therein, input/output (I/O) communications ports 425, and software 430. Each I/O communications port 425 has multiple communications channels for simultaneous connections with multiple local computers 100-1 to 100-N. The software 430 includes an operating system 432 and database management programs 434 to store information and perform the operations or transactions described herein. The transaction manager 400 of one embodiment may access data storage devices 415 which may contain a number of databases 420-1 to 420-N. Although the embodiment shown in FIG. 4 depicts the transaction manager 400 as a single server, a plurality of additional servers (not shown) may also be included as part of the transaction manager 400.

The transaction manager 400 of one embodiment is a Unix server which includes at least one gigabytes (GB) of memory.

ii. Queue 500

The queue 500 shown in FIG. 2 may perform the following functions: (i) receiving and storing jobs 182-1 to 182-N and task inputs 187-1 to 187-N from the transaction manager 400; (ii) exchanging information with a scheduler 600 such that jobs 182-1 to 182-N are routed to appropriate node computers 800-1 to 800-N; (iii) sending computation requests to node computers 800-1 to 800-N; and (iv) providing computation results (i.e., task outputs 189-1 to 189-N) when polled by the transaction manager 400. Because in some instances task outputs 189-1 to 189-N are not deleted even after they are retrieved by a calling application 180, it is essential to be able to store large amounts of data effectively and efficiently. The queue 500 of one embodiment may be a fault tolerant, persistent storage system responsible for receiving and storing jobs 182-1 to 182-N and task inputs 187-1 to 187-N from the transaction manager 400, executing scheduling commands (i.e., routing decisions) from the scheduler 600 and sending the computation requests and necessary inputs to the node computers 800-1 to 800-N that perform the computations, and receiving and storing task outputs 189-1 to 189-N for retrieval. When requested by a calling application 180, the transaction manager 400 may return the results of a computation stored in the queue 500 back to the calling applications 180-1 to 180-N corresponding to each job 182-1 to 182-N. In one embodiment, all information pertinent for a particular job 182 is stored, persistently, in the queue 500 at least until the job 182 has been completed or has expired.

The queue 500 of one embodiment may be able to handle large throughputs of requests with low latency. For example, the queue 500 of one embodiment may be able to process hundreds of thousands of requests per job 182, each request ranging in size from a few kilobytes to hundreds of kilobytes. For normal load conditions in the compute backbone 300 infrastructure of one embodiment, the time it takes to receive a request, send it to a node computer 800, and retrieve the result should take no more than 500 ms, with 100 ms or less being optimal. The queue 500 of one embodiment may be configured to operate with hundreds of node computers 800-1 to 800-N, a number of transaction managers 400-1 to 400-N and a number of schedulers 600-1 to 600-N. Hence, the configuration of the queue 500 may be closely correlated with that of the node computers 800-1 to 800-N, the scheduler 600 and the transaction manager 400, each of the components adapting to work most efficiently together. In such an embodiment, the queue 500 may represent the single point of failure for the compute backbone 300, such that the number of components downstream of the queue 500 (i.e., node computers 800-1 to 800-N and global cache 900) may be increased substantially without increasing the probability of a failure of the entire compute backbone 300, even though the mean time to failure of some component downstream of the queue 500 is likely to decrease as the number of such components increases. With such an arrangement, the user 20 may be guaranteed to obtain a result from the compute backbone 300 even if all components downstream of the fault tolerant queue 500 fail and need to be replaced. In this way, the queue 500 may represent a minimum availability of the compute backbone 300.

To help ensure that a job 182 sent to the compute backbone 300 is processed to completion, the queue 500 may persist certain data, including: (i) meta-information associated with a particular job 182 (e.g., job priority and an identification of a worker 155), (ii) optional global data 188 that is to be made available to all of the computations in the job 182, which may be supplied at the time the job 182 is created or at some later time, (iii) one or more task inputs 187-1 to 187-N provided by the transaction manager 400 (the queue 500 may optionally delete the task inputs 187-1 to 187-N after the computation completes), (iv) task outputs 189-1 to 189-N generated by the computations (the queue 500 may optionally delete the task outputs 189-1 to 189-N after retrieval by the calling application 180), (v) in case of error, the task error output 189, which is stored in place of the real task output 189, and (vi) optionally, a computation log for use in debugging and/or verifying the computation results (however, even if such a computation log is generated, the calling application 180 may choose not to retrieve it). In the embodiment depicted in FIG. 2, the queue 500 may be, for example, a storage area network (SAN) such as an EMC Celerra File Server, a network attached storage (NAS), or a database server.

iii. Scheduler 600

In one embodiment, the scheduler 600 of the compute backbone 300 may route incoming tasks 186 to appropriate workers 155 on the node computers 800-1 to 800-N assigned to a particular user's 20 service. Another function of an embodiment of the scheduler 600 is to allocate an appropriate amount of computing resources to particular jobs 182-1 to 182-N based on (1) the amount of resources allocated to a particular service and (2) the resource requirements of the jobs 182-1 to 182-N (as communicated, for example, by the meta-information within each job 182). For example, based on a scheduling algorithm computed by the scheduler 600, a particular job 182 may be sent to a particular node computer 800 that is available for processing and has been assigned to a service. The scheduler 600 also may route a specific piece of work to a given node computer 800 upon request (e.g., based on meta-information contained within a job 182). In one embodiment, the scheduler 600 may use policy and priority rules to allocate, for a particular session, the resources of multiple CPUs in a pool of node computers 800.

As a user 20 monitors the progress of a particular calling application 180 running on the compute backbone 200, the user 20 may use the scheduler 600 to dynamically reallocate and/or adjust the computing resources (e.g., CPUs on the node computers 800-1 to 800-N) from one or more service(s) to another without entirely terminating any of the jobs 182-1 to 182-N running on the compute backbone 300. In particular, the scheduler 600 works with the service manager 700 to determine which node computers 800-1 to 800-N and/or other resources can be reallocated to other services.

Figure 5:
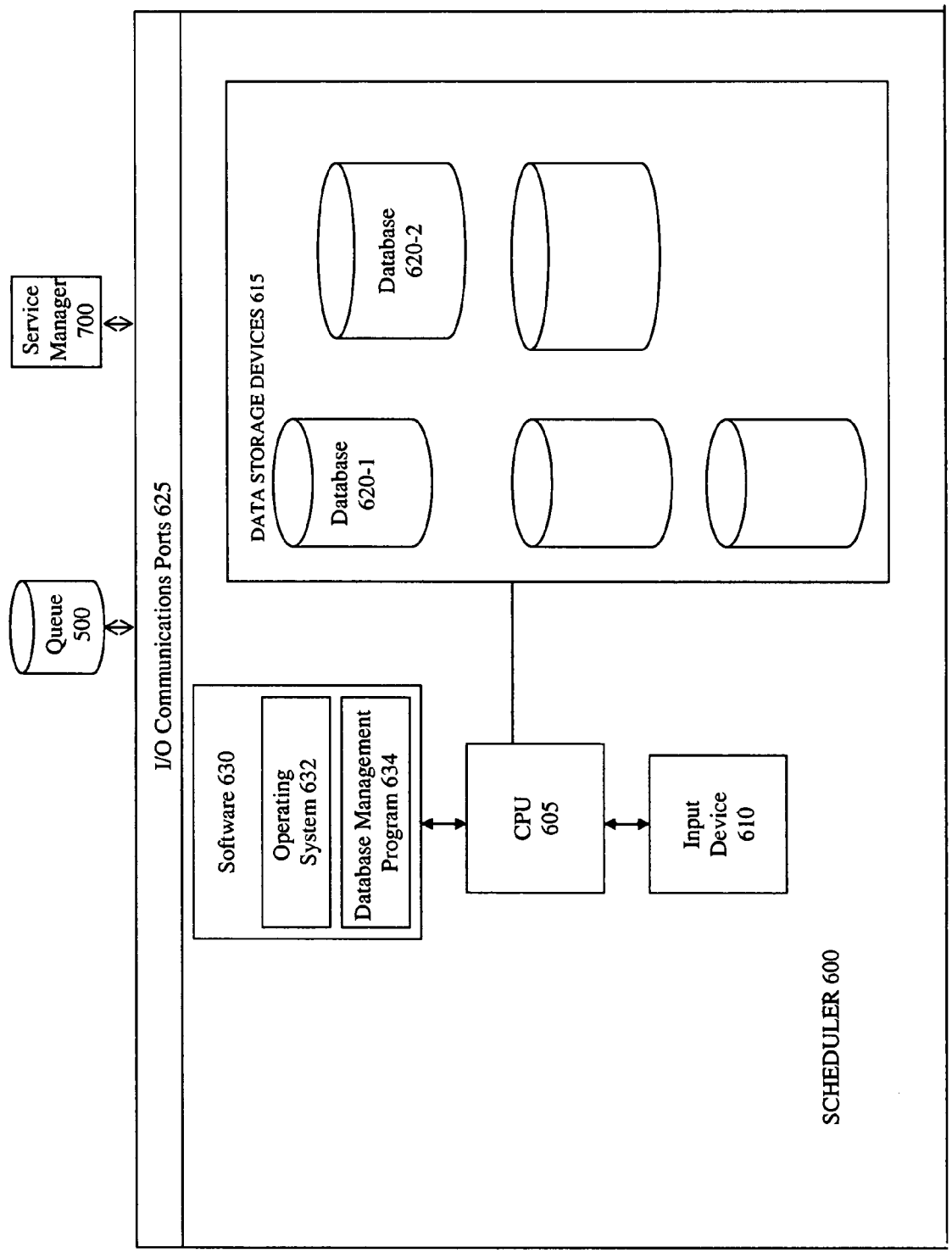
FIG. 5 illustrates certain components of one embodiment of a scheduler 600 of the system 10 shown in FIG. 2.

As shown in FIGS. 2 and 5, the scheduler 600 of one embodiment may be a server having a CPU 605 that is in communication with a number of components by a shared data bus or by dedicated connections. Such components may include one or more input devices 610 (e.g., CD-ROM drive and/or tape drive) which may enable instructions and information to be input for storage in the scheduler 600, one or more data storage devices 615, having one or more databases 620 defined therein, input/output (I/O) communications ports 625, and software 630. Each I/O communications port 625 may have multiple communication channels for simultaneous connections. The software 630 may include an operating system 632 and data management programs 634 configured to store information and perform the operations or transactions described herein. The scheduler 600 of one embodiment may access data storage devices 615 which may contain a number of databases 620-1 to 620-N. Although the embodiment shown in FIG. 2 depicts, the scheduler 600 as a single server, a plurality of additional servers (not shown) may also be included as part of the scheduler 600. In an alternative embodiment, the scheduler 600 may be one or more personal computers.

Using routing commands from the service manager 700, as well as the meta-information contained in each job 182, the scheduler 600 picks the best suitable request for a particular node computer 800 and assigns the request to that node computer 800. In the embodiment shown in FIG. 2, communications between the scheduler 600 and the node computers 800-1 to 800-N passes through the queue 500. The scheduler 600 also may communicate with the service manager 700 to take appropriate action when a node computer 800 becomes unavailable due to failure, reassignment for use by another service, suspension, or other reason. In such cases, the scheduler 600 reschedules computations running on the failed or reassigned node computer 800 so that the results from all jobs 182-1 to 182-N sent to the compute backbone 300 are eventually completed and returned to the appropriate calling application 180. Based on certain factors, including the load on a particular node computer 800, the scheduler 600 may also decide to run more than one computation at a time on the node computer 800. All the data used by the scheduler 600 may be persisted in the queue 500, and perhaps also the service manager 700. In one embodiment, the scheduler 600 may be forced to make, for example, hundreds of scheduling decisions per second. In certain embodiments, the scheduler 600 may also support load balancing, with more than one scheduler 600-1 to 600-N (not shown) being assigned to a particular service.

The scheduler 600 may change allocations while calling applications 180-1 to 180-N are running on the compute backbone 300. The combination of the scheduler 600, queue 500, service manager 700 and global cache 900 may allow dynamic re-allocation without loss of intermediate results.

iv. Service Manager 700

In one embodiment, the service manager 700 controls how resources on the compute backbone 300 are allocated to different users 20-1 to 20-N. In particular, each node computer 800-1 to 800-N provides the service manager 700 with information about its availability at any particular time. The service manager 700 of one embodiment allocates resources on the compute backbone 300 to users 20-1 to 20-N or groups of users such that failure of one user's 20-1 calling application 180-1 will not effect another user's 20-2 calling application 180-2 running on the compute backbone 300, even if both applications 180-1, 180-2 are running simultaneously. To achieve this isolation, a "service" is created for each user 20 or group of users. In one embodiment, the hardware portion of the service is an encapsulation (logical or physical) of all of the resources (e.g., number and identity of node computers 800-1 to 800-N, amount of storage capacity in the global cache 900, amount of database storage capacity, etc.) of the compute backbone 300 that are allocated for use by a particular user 20 at a particular time. In such an embodiment, the software portion of the service includes the worker modules 195-1 to 195-N that can perform specific computations for a particular user 20 or group of users. According to one embodiment, when a user 20 seeks to access the compute backbone 300, an administrator allocates resources to the user 20.

At any one time, a particular node computer 800 may be allocated only to one user 20. However, any one node computer 800 allocated to a particular user 20 may run multiple calling applications 180-1 to 180-N from the user 20 assigned to that node computer 800 during a specific time period. Furthermore, any one node computer 800 may be allocated to different users 20-1 to 20-N during different times of the day or week. For example, one user 20-1 may have access to node computers 800-1 to 800-10 from 9:00 a.m. to 11:00 a.m. every morning, while another user 20-2 has access to node computers 800-1 to 800-3 from 11:00 a.m. to 11:30 a.m. every Monday morning, while yet another user 20-3 has access to node computers 800-1 to 800-100 from 2:00 p.m. to 2:00 a.m. every Tuesday afternoon and Wednesday morning.

According to one embodiment, a user 20 may be allocated (and thus guaranteed) access to a predetermined number of node computers 800-1 to 800-N during a particular time period. In the event that some node computers 800-1 to 800-N have not been allocated to a particular user 20 at a particular time, such unused computation resources may be allocated to one or more users 20-1 to 20-N based on a set of criteria (e.g., one user 20-1 may be willing to pay up to a certain amount of money to secure the unallocated resources at a particular time, but will not be allocated those resources if another user 20-2 is willing to pay more). In an alternative embodiment, more elaborate resource sharing may be available such that allocated but unused resources may also be re-allocated based on a set of criteria.

In one embodiment, the service manager 700 monitors and accounts for all resources available on the compute backbone 300 and, in real time, provides the scheduler 600 with information about which services have been created and what specific resources have been allocated to each service. For example, a user 20 seeking to run a calling application 180 using the compute backbone must first be allocated a service, which includes, among other things, the processing capability of a specific number of specific type(s) of node computers 800-1 to 800-N during a specific time period.

The service manager 700 may reclaim particular node computers 800-1 to 800-N assigned to a particular service for use by a different service. The service manager 700 may also set limits on storage and other resources available to a service. In one embodiment, the service manager 700 collects accounting information from the node computers 800-1 to 800-N, and makes that accounting information available for reporting by an administrative GUI 1000 in order to supply users 20-1 to 20-N with billing and resource utilization information.

The service manager 700 of one embodiment persists at least the following information: (i) a complete inventory of node computers 800-1 to 800-N and storage resources, (ii) the resources allocated to each service, (iii) the resources requested by each user 20 or group of users, and (iv) resource usage and allocation information for use by the administrative GUI 1000 in creating accounting reports for users 20-1 to 20-N.

In one embodiment, the service manager 700 may be in direct communication with an administrative GUI 1000, the transaction manager 400 and the scheduler 600. In addition, the service manager 700 may receive information about the status of all node computers 800-1 to 800-N on the compute backbone 300 (e.g., failed, unavailable, available). The administrative GUI 1000 and its user interface software allow a user 20 to directly interact with the service manager 700 to change meta-information of a job 182 (e.g., modify the priority) and perform job control actions such as suspending, terminating and restarting the job 182. In addition, the transaction manager 400 may interact with the service manager 700 to programmatically prioritize, schedule and queue the jobs 182-1 to 182-N associated with the calling applications 180-1 to 180-N sent to the services of each user 20-1 to 20-N. Once a service has been created, the service manager 700 commands the scheduler 600 to begin scheduling particular jobs 182-1 to 182-N for processing on the node computers 800-1 to 800-N assigned to a particular service.

In the event a node computer 800 fails or becomes otherwise unavailable for processing, the service manager 700 detects the unavailability of that node computer 800 and removes the node computer 800 from the service allocated to the user 20. In addition, the service manager 700 prompts the scheduler 600 to re-queue the scheduling requests made previously (and/or being made currently) from the failed or unavailable node computer 800-1 to another available node computer 800-2.

Figure 6:
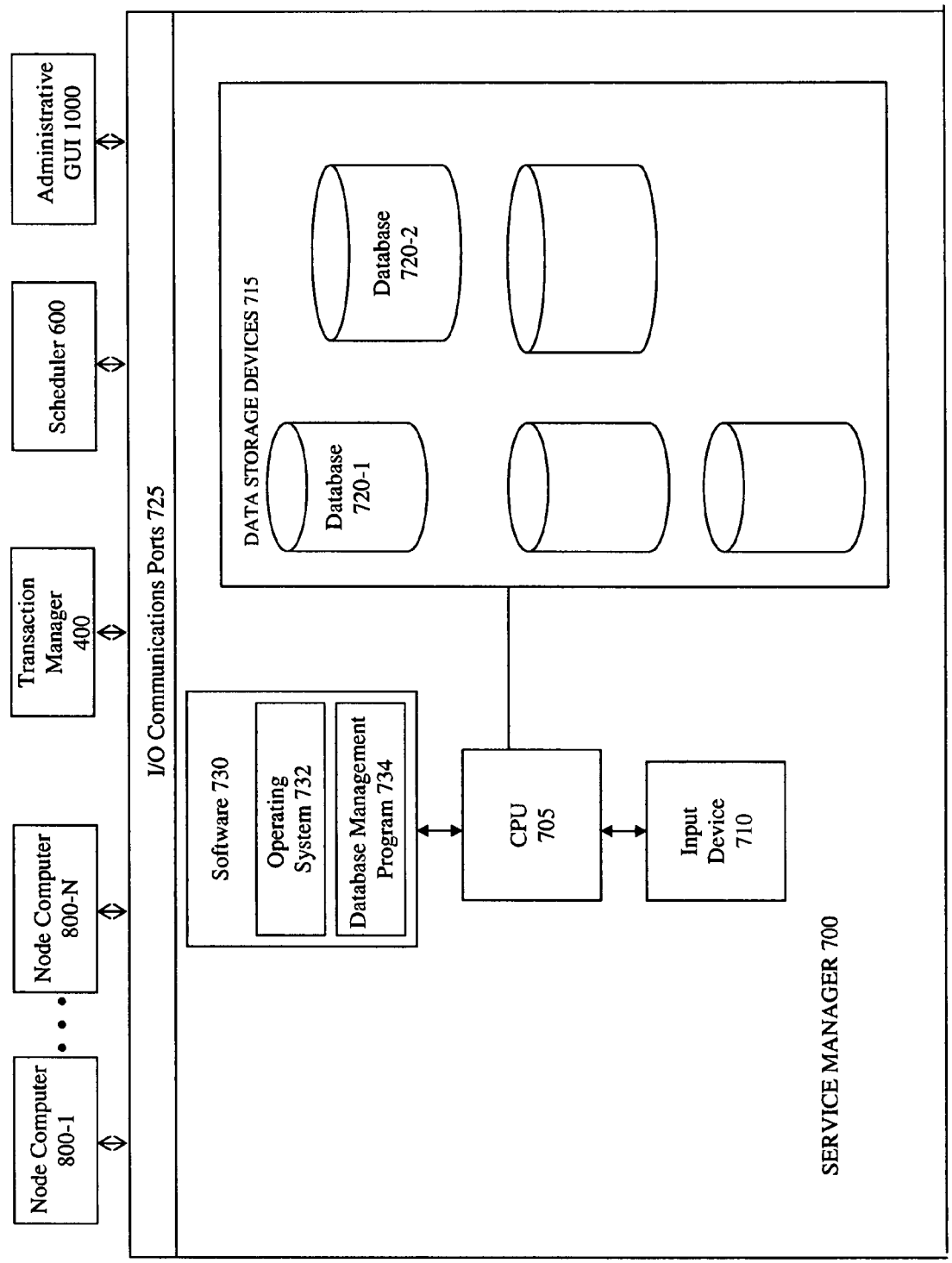
FIG. 6 illustrates certain components of one embodiment of a service manager 700 of the system 10 shown in FIG. 2.

FIG. 6 is a block diagram showing certain components of a service manager 700 according to one embodiment of the present invention. As FIG. 6 illustrates, the service manager 700 of one embodiment is a server having a central processing unit (CPU) 705 that is in communication with a number of components by a shared data bus or by dedicated connections—these components include one or more input devices 710 (e.g., CD-ROM drive, tape drive, keyboard, mouse and/or scanner) which enable information and instructions to be input for storage in the service manager 700, one or more data storage devices 715, having one or more databases 720 defined therein, input/output (I/O) communications ports 725, and software 730. Each I/O communications port 725 has multiple communications channels for simultaneous connections with multiple local computers 100-1 to 100-N. The software 730 includes an operating system 732 and database management programs 734 to store information and perform the operations or transactions described herein. The service manager 700 of one embodiment may access data storage devices 715 which may contain a number of databases 720-1 to 720-N. Although the embodiment shown in FIG. 6 depicts the service manager 700 as a single server, a plurality of additional servers (not shown) may also be included as part of the service manager 700.

V. Node Computer 800

In accordance with one embodiment, the node computers 800 perform computations according to scheduling commands from the scheduler 600. Each node computer 800 may provide the scheduler 600 and/or the service manager 700 with an availability status. A launcher 880 may reside on each node computer 800. On command from the scheduler 600, the launcher 880 can launch workers 155-1 to 155-N on the node computer 800 to invoke computations using the node computer 800 (i.e., provide inputs to the worker 155 and receive outputs from the worker). The launcher 880 may also provide a worker 155 with access to infrastructure components of the compute backbone 300, such as global cache 900, and to the attendant operability of the compute backbone 300, such as the ability to distribute computations (as discussed below in section E.). In the embodiment shown in FIG. 2, compute-dense valuation requests are performed on a pool of physically centralized node computers 800-1 to 800-N located remotely from the local computers 100-1 to 100-N. The node computers 800-1 to 800-N need not be identical. In one embodiment, a node computer 800-1 may be, e.g. a Netra st A1000/D1000 made by Sun Microsystems, while another may be, e.g. a cluster of ProLiant BL e-class servers in a rack system made by Compaq.

Figure 7:
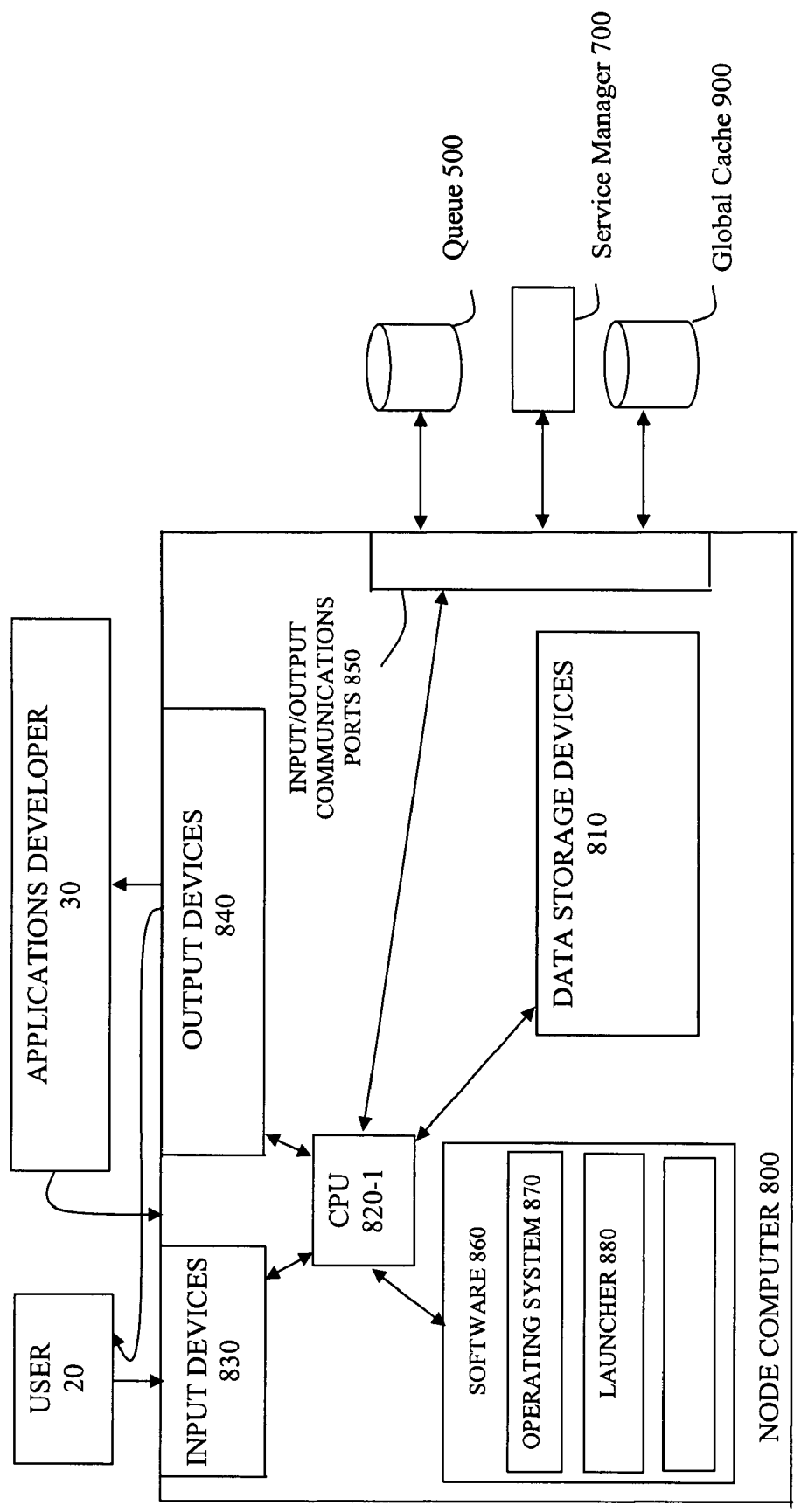
FIG. 7 illustrates certain components of one embodiment of a node computer 800 of the system 10 shown in FIG. 2.

FIG. 7 is a block diagram illustrating certain components of a node computer 800 according to one embodiment of the present invention. As FIG. 7 shows, at least one type of node computer 800 is a server having one or more central processing units (CPU) 820-1 to 820-N in communication with a number of components by a shared data bus or by dedicated connections—these components include data storage devices 810, one or more input devices 830 (e.g., CD-ROM drive and/or tape drive) which enable information and instructions to be input for storage in the node computer 800, one or more output devices 840, input/output (I/O) communications ports 850, and software 860. Each I/O communications port 850 has multiple communications channels for simultaneous connections with the node queue 550, intermediate cache 1050 and global cache 900. The software 860 may include an operating system 870, a launcher 880 and other programs to manage information and perform the operations or transactions described herein. A node computer 800 of one such embodiment may be include one or more relatively high-speed CPUs 820-1 to 820-N, and a relatively large amount of RAM. However, certain individual node computers 800-1 to 800-N may have different physical qualities than others. For example, part of the compute backbone 300 may be a dedicated cluster. Some or all of the node computers 800-1 to 800-N of one embodiment may be commodity computing devices, such as relatively inexpensive, standard items generally available for purchase such that they may be replaced easily as technology advancement provides faster and more powerful processors and larger more efficient data storage devices.

In one embodiment, the compute backbone 300 infrastructure may have heterogeneous node computers 800-1 to 800-N the computing resources of which may be made available to a number of local computers 100-1 to 100-N running different types of operating systems and completely independent applications 180-1 to 180-N. For example, a local computer 100 running an operating system by Sun Microsystems may be capable of accessing a worker 155 that is written as a MicroSoft Windows dynamic link library (DLL).

vi. Global Cache 900

Because the compute backbone 300 infrastructure of the embodiment shown in FIG. 2 comprises a closely coupled cluster of resources with relatively fast interconnections between them, it is possible to give each node computer 800-1 to 800-N access to a sufficiently low latency resource, in which to store its intermediate computation results. The global cache 900 of one embodiment is a persistent storage facility provided to the computations being executed on the compute backbone 300 which allows those computations to share intermediate data and/or to optimize database access. In one embodiment, a global cache 900 may include both a hardware configuration and a software component, the software component being configured such that the functionality of the global cache 900 will appear to be the same (and operate in the same manner) regardless of which particular hardware component or configuration is being used to implement the cache at a particular time. In one embodiment, a hardware configuration for the global cache 900 may include a number of components, some of which may be located in geographically separate locations.

Workers 155 running on the compute backbone 300 may use the global cache 900 to persist all intermediate data for which the time required to obtain such data (via either computation or accessing a database external to the compute backbone 300) is at least marginally greater than the time it takes to persist it in the global cache 900. For example, if it takes 50 ms to retrieve a 1 MB file and 50 ms to de-persist that file from global cache 900, but it takes two seconds of computation time to compute the data stored in the 1 MB file, it may be more efficient to access the global cache 900 to obtain the file rather than computing the results contained in the file. The global cache 900 of one embodiment (i) provides workers 155-1 to 155-N a place to store and retrieve intermediate computation results in a persistent storage, (ii) allows computations to share intermediate data that takes less time to persist than to re-compute or re-retrieve from an external source, and (iii) provides a means of inter-process communication between the workers 155-1 to 155-N working on compute requests belonging to the same job 182. In accordance with one embodiment, data stored in the global cache 900 is only visible to computations belonging to the same job 182. In accordance with another embodiment, data stored in the global cache 900 is visible to computations of multiple jobs 182-1 to 182-N.

The global cache 900 shown in FIG. 2 is implemented as a file system on a storage area network (SAN) or a network attached storage (NAS) with a data rate of, for example, approximately 100-250 MB per second. However, in an alternative embodiment, the global cache 900 may also be implemented as a database running on a redundant array of independent disks (RAID) using a 1 gigabit ethernet vii. Administrative General User Interface 1000

The administrative general user interface (GUI) 1000 of one embodiment may allow administration of various aspects of the compute backbone 300 infrastructure and calling applications 180-1 to 180-N running thereon, including (i) monitoring the operational availability of components of the compute backbone 300, (ii) creating a new service and allocating resources to it, (iii) granting calling applications 180-1 to 180-N rights to the allocated resources, and (iv) troubleshooting a service in the event of a failure. In particular, such an administrative GUI 1000 may enable a user 20 to deploy worker modules 195-1 to 195-N and other data files to a service, and to upload and delete worker modules 195-1 to 195-N. For example, using the administrative GUI 1000, a user 20 can obtain accounting, usage and demand pattern information regarding computing and storage resources on the compute backbone 300. Periodic reports can be generated to show a user 20 the amount of resources it requested, was allocated, and utilized for each calling application 180 run on the compute backbone 300. Using the administrative GUI 1000, a user 20 may also add, reserve or remove resources used by a service, such as node computers 800-1 to 800-N and data storage.

The administrative GUI 1000 of one embodiment may also enable a user 20 to monitor the status of jobs 182-1 to 182-N deployed and/or running on the node computers 800-1 to 800-N, including the progress of each job 182 and its resource utilization. Logs generated by the workers 155-1 to 155-N running in a particular job 182 may also be displayed on an administrative GUI 1000. Furthermore, an authenticated user 20 may be able to cancel or suspend a job 182 through the administrative GUI 1000, as well as change the priority of jobs 182-1 to 182-N already scheduled for or undergoing computation on the compute backbone 300. A user 20 may also cancel or reset an entire service using the administrative GUI 1000 of one embodiment, thereby terminating all jobs 182-1 to 182-N running on the service.

In one embodiment, the administrative GUI 1000 is a personal computer capable of accessing the service manager 700 over a network connection such as local area network or an Internet.

II. Method Embodiments of the Invention

Having described the structure and functional implementation of certain aspects of embodiments of the system 10 of one embodiment, the operation and use of certain embodiments of the system 10 will now be described with reference to FIGS. 6-11, and continuing reference to FIGS. 2-5.

A. Method of Developing a Worker Module 195

In one embodiment, an application developer 30 may create a worker module 195 to be a shared library capable of exposing its main compute function or engine, called a worker 155, in accordance with a convention specified by an API 190. In particular, the workers 155-1 to 155-N within a particular worker module 195 may be uniquely identified by a name/version pair coded into the worker module 195 at the time it is compiled, and may be discovered by the compute backbone 300 during deployment of the worker module 195. In one embodiment, a single worker module 195 may be configured to expose more than one worker 155-1 to 155-N, perhaps simplifying somewhat the development and subsequent deployment of the worker module 195. In some cases, a user 20 may be able to combine all of the functionality corresponding to a particular calling application 180 to be deployed on the compute backbone 300 into a single worker module.

B. Method of Deploying a Worker Module 195 on the Compute Backbone 300

Rather than a traditional executable file, one embodiment of a worker module 195 deployed on the compute backbone 300 of one embodiment may be a shared library identified by its name, a session enterprise Java bean (EJB) or an executable file compliant with a compute backbone 300. Once such a worker module 195 is developed, a user 20 and/or applications developer 30 may access the administrative GUI 1000 to deploy the worker module 195 onto the compute backbone 300. Alternatively, a worker module 195 may be deployed programmatically. According to one embodiment, the compute backbone 300 checks to ensure that each worker 155 contained within a worker module 195 is unique before such a worker 155 may be deployed.

In such an embodiment, when a node computer 800 on the compute backbone 300 receives a job 182 with, for example, a particular computation to be performed, the node computer 800 may first initialize the worker module 195, and then invoke one or more workers 155-1 to 155-N embedded therein. This worker module 195 may then remain initialized, ready, for example, to perform further computations and/or to store intermediate data directly in global cache 900. Such a worker module 195 need not, however, stay initialized for the duration of an entire job 182. In certain instances, the compute backbone 300 infrastructure may have an need to reassign the node computer 800, in which case the worker module 195 may be terminated, potentially causing any task 186 currently running on that node computer 800 to be rescheduled. In the event that a job 182 is rescheduled, however, the persistent global cache 900 may be available to provide intermediate results computed by the node computer 800 on which the job 182 was originally running, and to thereby allow the job 182 to continue computations using those intermediate results without being re-run in its entirety.

Using an administrative GUI 1000, a user 20 and/or applications developer 30 may also deploy and manage additional data required by a worker module 195, such as dependent shared libraries or configuration files. In one embodiment, any such extra data is to be stored in a directory accessible to the worker module 195 during runtime, and its location is made available to the computation as it is being processed.

One embodiment of the compute backbone 300 may be capable of detecting conflicts between worker modules 195, and alerting users 20-1 to 20-N in order to prevent deployment of worker modules 195 that export duplicate workers 155. To help ensure service coherency, worker modules 195-1 to 195-N deployed on the compute backbone 300 are to be unique. According to one embodiment, the service manager 700 may verify that not only the name and version number of a particular worker module 195 to be deployed is unique, but also that the functionality of a worker module 195 to be deployed has not already been deployed on the compute backbone 300.

D. Method of Performing Computations Using a System with a Compute Backbone 300

Rather than a number of users 20-1 to 20-N each porting an entire long running executable computer program to run on a common platform of processors, one method embodiment of the present invention allows a user 20 to move just the compute-dense sections of a calling application 180 onto a network-accessible computing service, which is the compute backbone 300 described above.

According to one method embodiment of the present invention, certain computations may be accomplished by invoking a compute function (i.e., worker 155) to access at least one input object (i.e., task input 187) in order to create at least one output object (i.e., task output 189). Inputs and outputs may both be objects in a particular programming language.

In this method embodiment, computations performed on the compute backbone 300 may be grouped in sets called jobs 182. The jobs 182 of such an embodiment are to be the smallest units that can be managed either by a user 20 directly (through the administrative GUI 1000) or programmatically. These jobs 182 may have meta-information associated with them (e.g., priority and specific resource requirements), which enable the service manager 700 to assign the job 182 to an appropriate node computer 800 at an appropriate time. According to this method embodiment, when creating a job 182, a user 20 and/or application developer 30 specifies the worker 155 that will perform computations for a particular job 182.

Once a job 182 is created, a calling application 180 may proceed to schedule computations, with the compute backbone 300, in units called tasks 186. According to one embodiment, a task 186 includes a task input 187 (e.g., an object or structured message) that is accessed by the worker 155 to create a task output 189 (e.g., another object or structured message). The task output 189 may be returned upon successful completion of the computation. In the case of a failure (i.e., the computation was not completed) an error indication may be returned in place of the task output 189. The user 20 and/or application developer 30 may also specify optional global data to be used by the job 182 at the time the job 182 is created. This global data indicates to the scheduler 600 that it is to be made available to all computations within a job 182.

In accordance with this method embodiment, the calling application 180 may indicate to the compute backbone 300 (in particular, the scheduler 600) that its tasks 186-1 to 186-N are to be computed either synchronously or asynchronously. In a synchronous computation mode, a thread in a calling application 180 may first submit to the compute backbone 300 a job 182 containing one or more task 186-1 to 186-N, and then wait for the results of each successive computation. In an asynchronous computation mode, a calling application 180 may submit the tasks 186-1 to 186-N to the compute backbone 300 and receive back an identifier, unique in the scope of the particular job 182, which the calling application 180 or some other application may later use to poll the compute backbone 300 for results (in particular, the transaction manager 400 and the queue 500).

In one embodiment, the compute backbone 300 persistently stores in the queue 500 all task inputs 187-1 to 187-N and task outputs 189-1 to 189-N involved with a particular job 182. In such an embodiment, this information may be deleted only when the job 182 is completed, or when the job 182 expires. According to this embodiment, however, the information is not to be deleted if the job 182 is terminated due to the failure or reassignment of the node computer 800 on which it was running. The time of expiration for a job 182 may be specified at the time the job 182 is created, and may be stored as part of the meta-information for use by the compute backbone (in particular, the scheduler 600 and/or service manager 700).

Figure 8A:
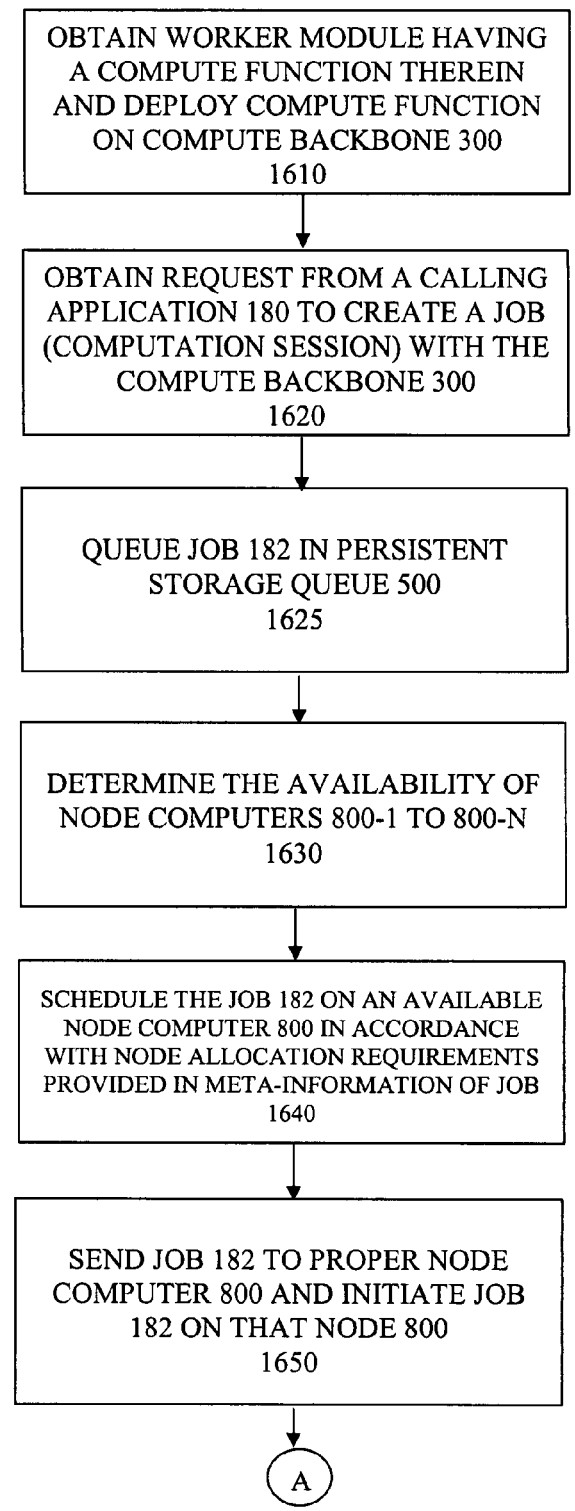
FIGS. 8a and 8b illustrate one embodiment of a method of executing a computing application using the system shown in FIG. 2.
Figure 8B:
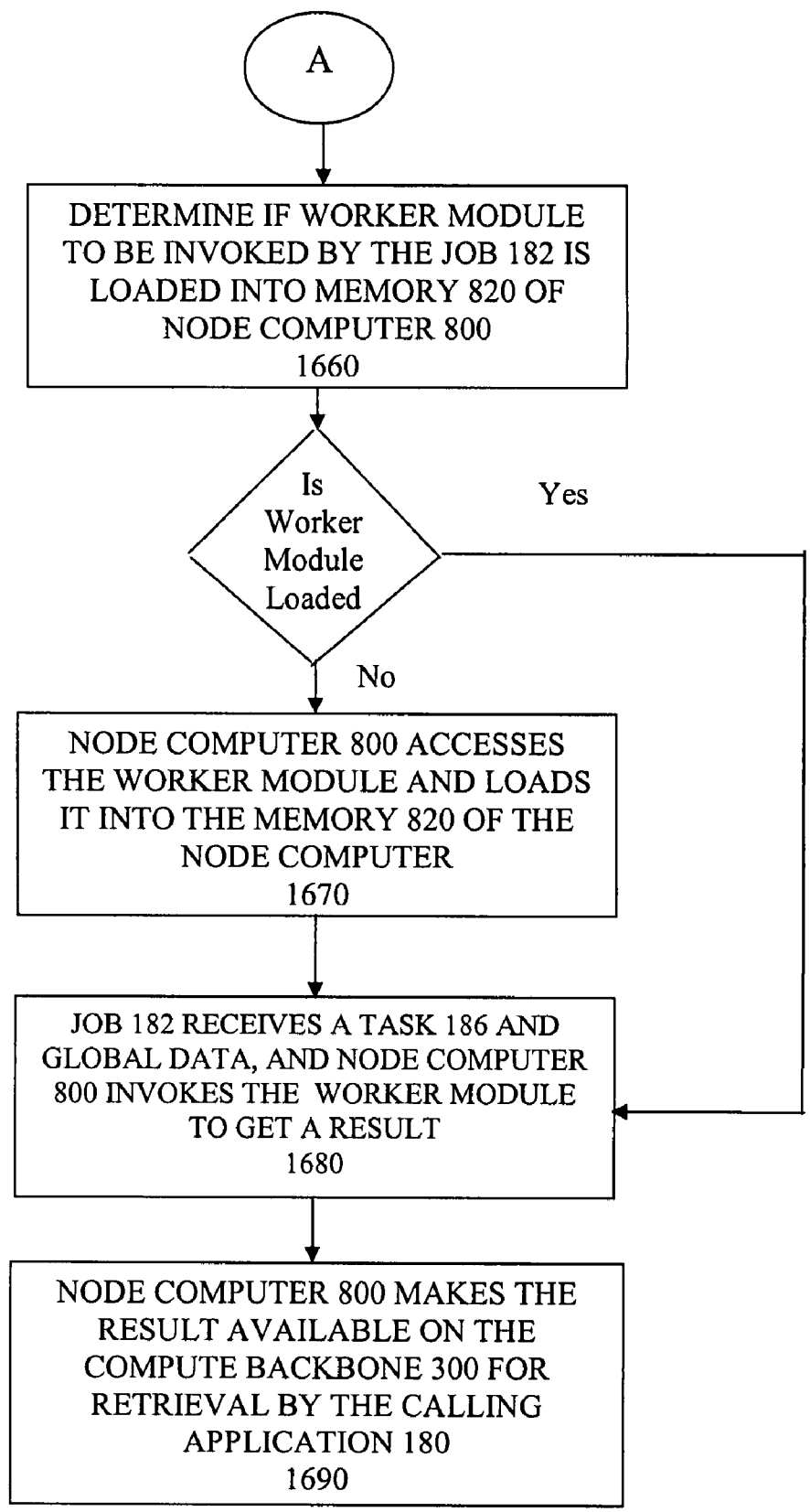

FIGS. 8*a*-8*b* illustrate certain operations performed in one embodiment of a method of computing a result using a system 10 as described above. In particular, a worker 155 is deployed on the compute backbone 300. From another point of view, the compute backbone 300 obtains a worker module 195 which contains a worker 155 (step 1610). Then, the compute backbone 300 obtains one or more jobs 182-1 to 182-N associated with one or more calling applications 180-1 to 180-N residing on one or more local computers 100-1 to 100-N (step 1620). Each job 182-1 to 182-N is stored in the queue 500 prior to processing (step 1625). The compute backbone 300 determines availability of the node computers 800-1 to 800-N (step 1630), and schedules the jobs 182-1 to 182-N on available node computers 800-1 to 800-N in accordance with any specification of a minimum number or type of nodes necessary for the job as specified by meta-information (step 1640). The jobs 182-1 to 182-N are then sent to the proper node computers 800-1 to 800-N and initiated or opened on those nodes (step 1650). When a node computer 800 receives a job 182, the node computer 800 determines whether or not the worker module 195 containing the worker 155 to be called has been loaded into the memory 820 of the node computer 800 (step 1660). If the worker module 195 containing the compute function to be invoked by the job 182 has not yet been loaded, the node computer 800 accesses the worker module 195 and loads it into the memory 820 of the node computer 800 (step 1670). In one embodiment, the job 182 may then receive one or more tasks 186-1 to 186-N and, if provided, global data. According to the job 182 of a particular calling application 180, the node computer 800 then calls the worker 155 to get a result (step 1680). Although the job 182 need not receive a task 186 at the time of job creation, a task 186 may be supplied at that time. Once the compute function has accessed the task input 187 to create the task output 189, the node computer 800 makes the task output 189 available on the compute backbone 300 (in particular, the queue 500 and/or transaction manager 400) such that the calling application 180 is able to retrieve the result (step 1680).

While a job 182 being processed on the compute backbone, access to the job 182 need not be limited only to the particular calling application 180 that initiated it. In one method embodiment, once a job 182 is created, other processes may be attached to the job 182 and have access to the same functionality as the original job 182. According to one method embodiment, two or more calling applications 180 may access a particular job 182. For example, the calling application 180-1 of one service may be sending information to a job 182 while the calling application 180-2 of a second service is receiving information from the job 182. In such an embodiment, the user 20 of the calling application 180-2 of the second service need not know where the inputs to the job 182 originated, what those inputs contain, or where the job 182 is being processed on the compute backbone 300.

In a particular method embodiment, a job 182 is given an identifier at the time it is created such that the job 182 may be uniquely identified by the compute backbone 300. A first calling application 180-1 then sends the job 182 to the compute backbone 300 for processing. During such processing, a second calling application 180-2 may request access to the job 182. If the user 20 of the second calling application 180-2 has appropriate access (e.g., confirmed by entry of a password assigned to the user 20 of the second calling application 180-2), the second calling application 180-2 may be granted access to the job 182.

E. Method of Dividing Computations

The system 10 according to one embodiment of the present invention may also enable computations to be distributed and to support certain patterns of communication and job logic. For example, a job 182 running on a node computer 800 of the compute backbone 300 may itself create a new "descendant" job, which creates its own task inputs 187-1 to 187-N and retrieve its own task outputs 189-1 to 189-N. Those descendent jobs 182-1 to 182-N created by the "parent" job 182 are new jobs themselves, and may then be scheduled by the scheduler 600 and may be sent for computation, for example, to different node computers 800-1 to 800-N, and to a node computer 800 other than the one processing the parent job 182. Upon completion of the descendant jobs 182-1 to 182-N, the parent job 182 may aggregate the results of the descendant jobs 182-1 to 182-N and use them as task inputs 187-1 to 187-N to in turn create task output 189 for the parent job 182.

Figure 9:
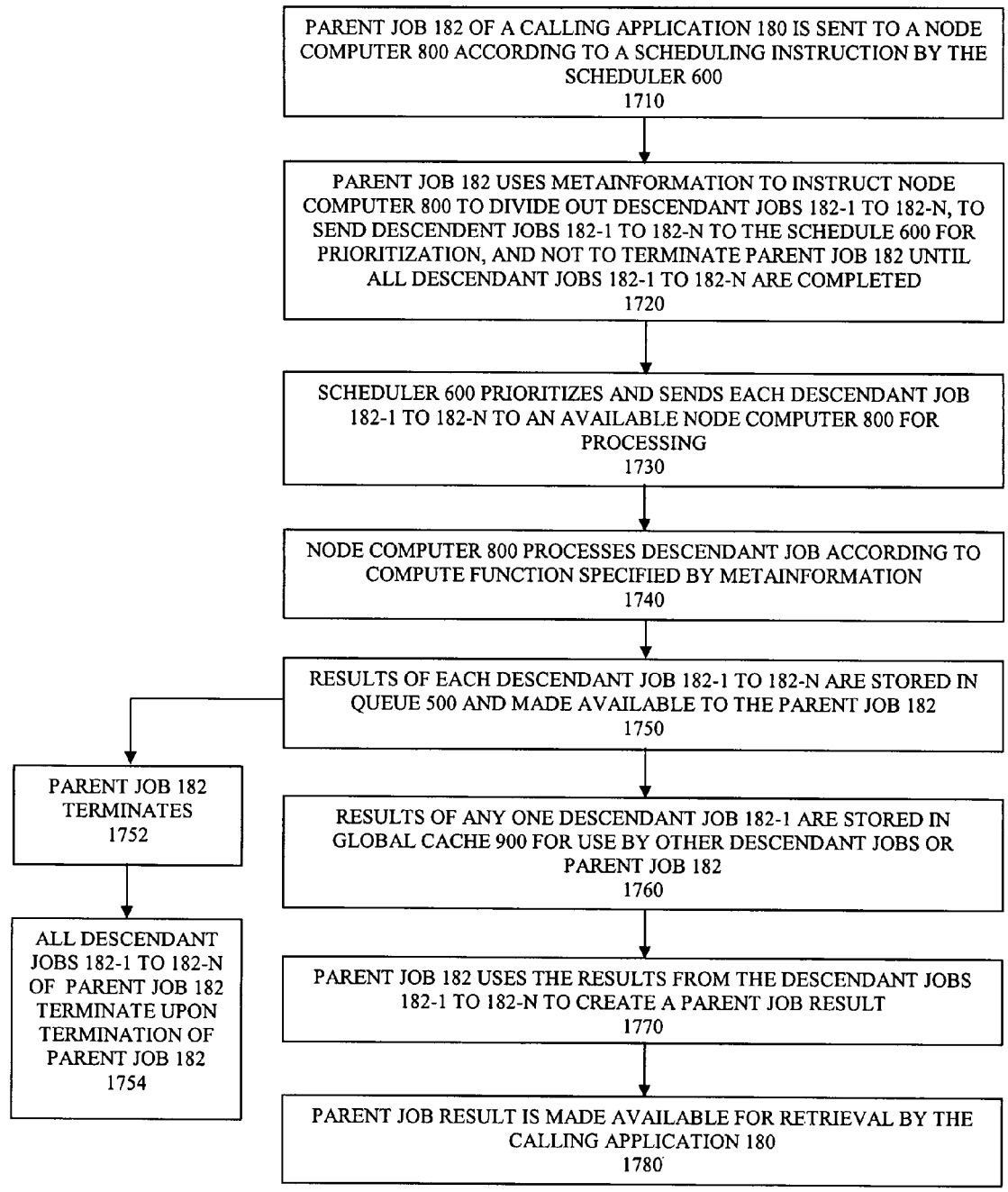
FIG. 9 illustrates one embodiment of a method of distributing computations using the system 10 shown in FIG. 2.

FIG. 9 illustrates certain operations performed in one embodiment of a method of computing a result using jobs that recursively divide. In particular, a parent job 182 may be scheduled and sent to a node computer 800 by the scheduler 600 (step 1710). The parent job 182 may be received by the compute backbone 300 from a calling application 180, or may itself be a descendant job. Such a parent job 182 may be programmed to include meta-information such that the node computer 800 will (1) divide out any descendant jobs 182-1 to 182-N, each of which then may be sent to the scheduler 600 (step 1720), and (2) identify the job as a parent job. Using the meta-information associated with each descendant job 182-1 to 182-N, the scheduler 600 may prioritize and send those descendants to available node computers 800-1 to 800-N for computation (step 1730). In such an embodiment, the scheduler 600 may avoid reassigning the node computer 800 on which a parent job 182 is running (and may avoid otherwise terminating the parent job 182) until all descendant jobs 182-1 to 182-N have been completed. In this way, although the node computers 800 may be considered volatile resources for purposes of processing jobs in general (because a node computer running a job other than a parent job 182 may be re-assigned by the scheduler 600 at any time, and the scheduler 600 may re-assign a non-parent job to a new node computer 800 at any time), a node computer processing a parent job 182 is given priority over other node computers until all of its descendant jobs 182-1 to 182-N have completed.

The node computer 800 may process the descendant job according to one or more workers 155-1 to 155-N specified by meta-information contained in the descendant job (step 1740). Upon completion of each descendant job 182-1 to 182-N, each node computer 800-1 to 800-N running a descendant job 182 may make the result from each such job available to the parent job 182 by storing those results in the queue 500 (step 1750). In addition, intermediate and/or final results of each descendant job may be stored in the global cache 900 for use by other jobs, including other descendant jobs and/or the parent job (step 1760). Then, the parent job 182 may access the queue 500 and/or global cache 900 to obtain the results from the descendant jobs 182-1 to 182-N, which may be task outputs 189-1 to 189-N of the descendant jobs 182-1 to 182-N, and may use them to create its own result (another task output 189) (step 1770). As a further example, the results from the descendant jobs 182-1 to 182-N may be sent directly to the parent job 182 without passing through the queue 500 and/or global cache 900. The result created by the parent job 182 then may be sent from the node computer 800 to the transaction manager 400 for retrieval by the calling application 180 (step 1780).

In one embodiment, the scheduler 600 may contain algorithms which recognize meta-information in a parent job 182 that identifies it as such, and may attempt to ensure that the node computer 800 on which a parent job 182 is running is not interrupted until all of the descendant jobs 182-1 to 182-N have been completed. Furthermore, such meta-information may identify a particular worker 155 for use in performing a computation. If the scheduler 600 must vacate a node computer 800, the scheduler 600 of such an embodiment will endeavor not to vacate a node computer 800 that has parent jobs 182-1 to 182-N running on it. However, if a parent job 182 is prematurely terminated (step 1752), all of its descendants may also be terminated (step 1754).

F. Method of Caching Results

In one embodiment, all processes running on the node computers 800-1 to 800-N of the compute backbone 300 have access to the global cache 900. During computation of a particular job 182 on a particular node computer 800, intermediate or partial results created by the job 182 may be stored in the global cache 900. For example, a worker module 195 may store an intermediate result as it computes a task 186. In addition, a job 182 may store in the global cache 900 data obtained from sources external to the node computers 800-1 to 800-N. According to this embodiment, once the intermediate result or other external data is stored in the global cache 900, all jobs 182-1 to 182-N within the proper scope that are running on all node computers 800-1 to 800-N of the compute backbone 300 have access to it. The scopes may include (1) a service-level scope, wherein the cached result is made available to all jobs 182-1 to 182-N within a particular service, (2) a parent-level scope, wherein the cached result is made available to the parent job and all of its descendant jobs, and (3) a job-level scope, wherein the cached result is made available only to tasks 186-1 to 186-N within one particular job 182.

The global cache 900 of one embodiment may have an interface similar to a hash map. This global cache 900 may access data using a key/result pair, each key being unique within the scope of a job 182.

At the time a job 182 is created, a user 20 and/or applications developer 30 may identify intermediate or partial results of a job 182 that might be cached in the global cache 900 more quickly than they could be computed by a particular node computer 800 or retrieved from a source external to the compute backbone 300. For example, a high speed network connection may allow a node computer 800 to access previously computed data stored in the global cache 900 more quickly than the node computer 800 can itself compute the cached data. Also at the time a job 182 is created, a user 20 and/or application developer 30 may identify data from sources external to the global cache 900 that might be cached by a job 182 to reduce contention by other node computers 800 or other components of the compute backbone 300 for the external resource.

Figure 10A:
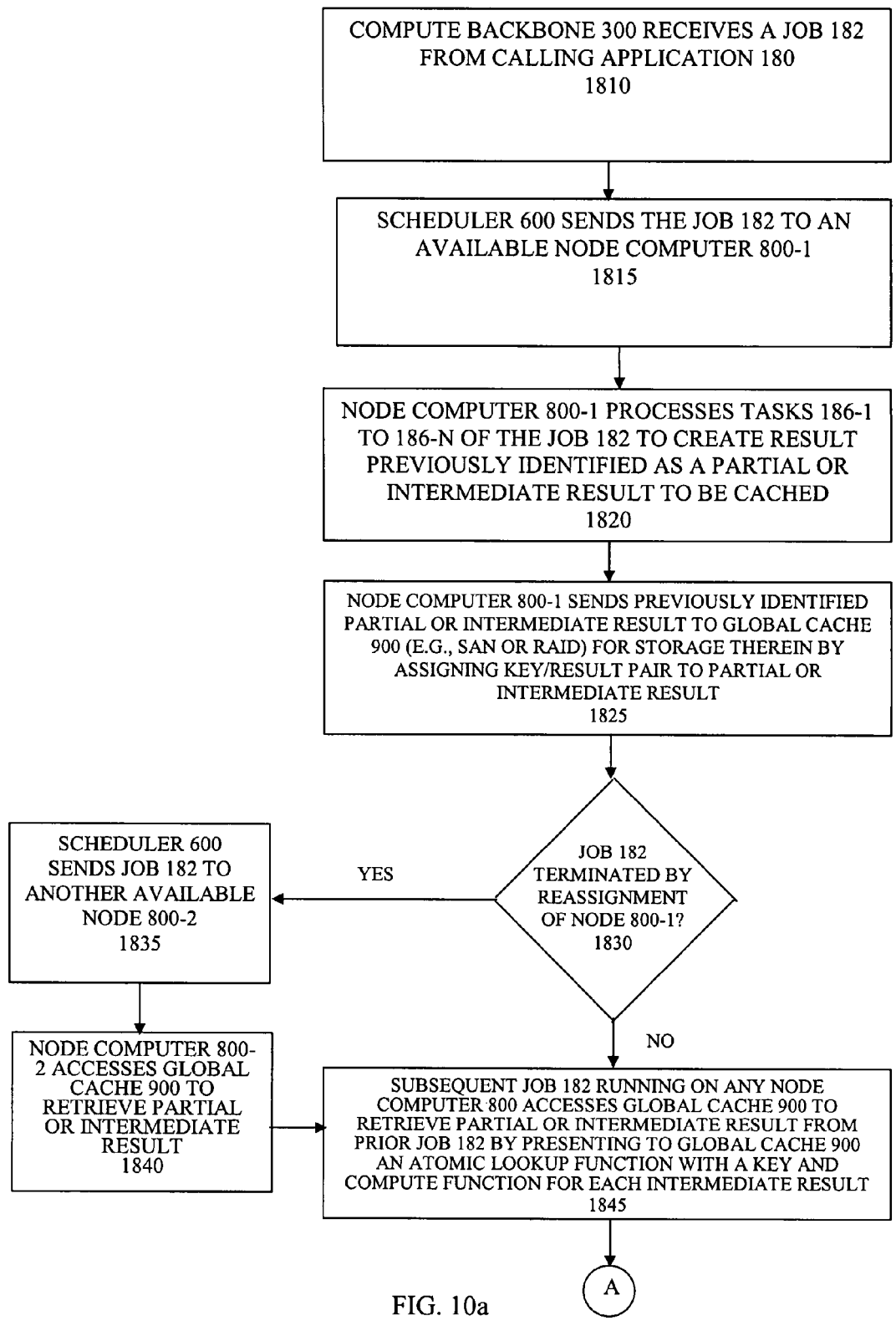
FIGS. 10a and 10b illustrate one embodiment of a method of caching results using the system 10 shown in FIG. 2.
Figure 10B:
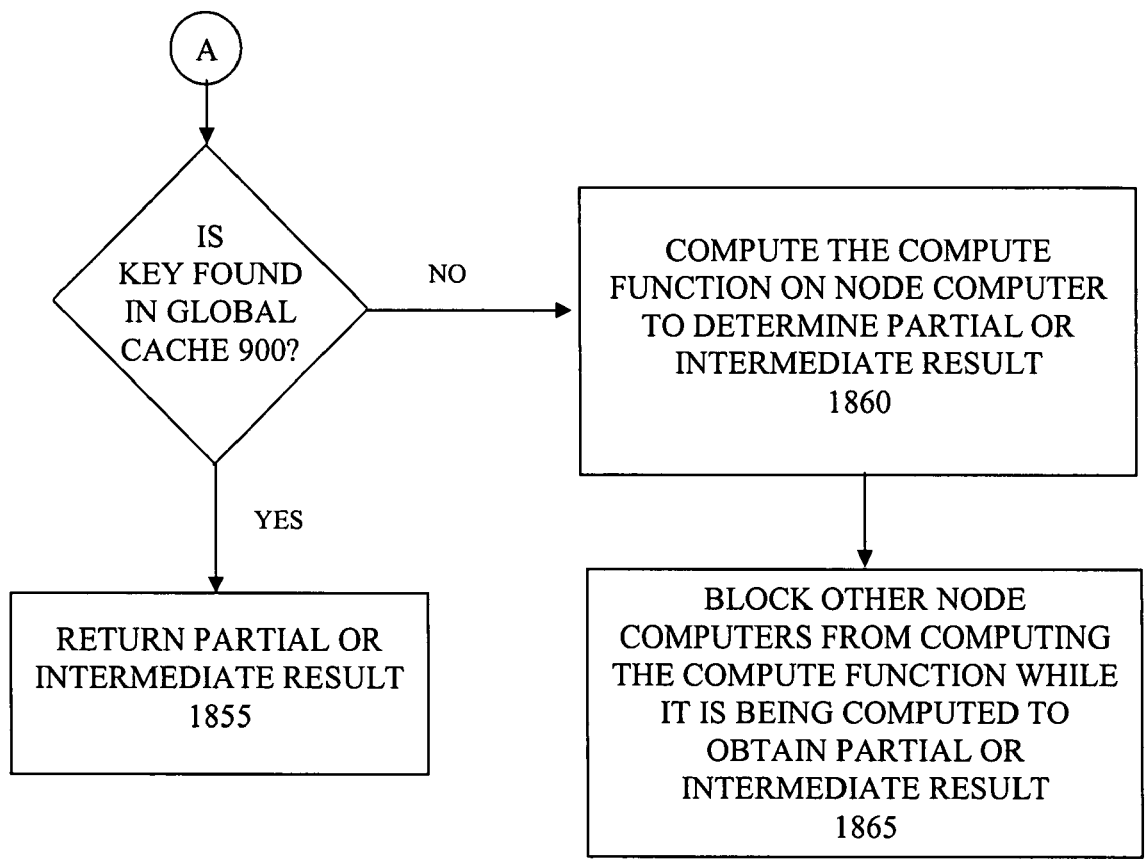

FIGS. 10a and 10b illustrate certain operations performed in one embodiment of a method of caching intermediate results. In particular, a calling application 180 may send a job 182 identifying a worker 155 by its name/version pair to the compute backbone 300 (step 1810). The scheduler 600 may then send the job 182 to an available node computer 800 (step 1815). The node computer 800 may then process the job 182 and create a result previously identified as a partial or intermediate result to be made available to other computations (step 1820). The node computer 800 then may send the partial or intermediate result to the global cache 900 for storage therein (step 1825). In accordance with one embodiment, a key/result pair may be assigned to the stored intermediate result. If a job 182 terminates during computation (e.g., by reassignment of the: node computer to a new service (step 1830) or by failure of the node computer 800), the scheduler 600 may send the job 182 to another available node computer 800-2 (step 1835). The new node computer 800-2 then may access the global cache 900 to retrieve intermediate data computed during the initial processing of the job such that the job need not be recomputed in its entirety (step 1840). At some later time, any job 182-2 running on any node computer 800 can access the global cache 900 to retrieve the partial or intermediate result from the earlier job 182-1, which may have been computed on a different node computer 800 and may have terminated long ago (step 1845).

According to the method embodiment shown in FIGS. 10a-10b, a job 182-2 seeking to retrieve a cached result from an earlier job 182-1 may present to the global cache 900 a lookup function which is atomic because it has both a key and a compute function associated with the result sought to be retrieved from the global cache 900. In the event that the key is found (step 1855), the global cache 900 returns the requested result to the job 182-2. If the key is not found (step 1860), however, the node computer 800 on which the job 182-2 is running may compute the requested result using the compute function of the lookup function. In the event that a subsequent job 182-3 attempts to access the result currently being computed, the node computer 800 on which that subsequent job 182-3 is being run may be prevented from computing the compute function and, instead, prompted to wait for the job 182-2 computing the result to finish its computation and caching of the result (step 1865). In this embodiment, the job 182 may seek the result of a function that has been identified as cachable, so that the key and associated compute function are presented to the cache, hence the global cache 900 access is atomic from the viewpoint of the worker module.

In accordance with one embodiment, calling one atomic lookup function may return several intermediate results at once. In such an embodiment, the lookup function includes a key and a compute function for each of the intermediate results called for by the lookup function.

G. Illustrative Computation According to Method Embodiments

To further illustrate both a method of caching intermediate results and a method of computing a result using recursively dividing jobs 182-1 to 182-N, consider a calling application 180 programmed to compute the value of a portfolio containing one thousand instruments. Consider also that the calling application 180 is programmed to reflect the market environment in which the value of the particular portfolio is to be determined. Further consider that at least a portion of the market environment must also be established (e.g., certain yield curves must be computed in order to fully define the market environment).

According to one method embodiment, the calling application 180 may invoke a worker 155 called "value portfolio," and also pass to the compute backbone 300 a set of inputs representing the market environment in which the value of the particular portfolio is to be calculated. Next, the "value portfolio" worker 155 may perform some preliminary yield curve calculations to more fully define the market environment. The results of those preliminary calculations may be stored in the global cache 900 and made available to other "value portfolio" workers 155-1 to 155-N. Such intermediate results defining the market environment (now stored in global cache 900) may be available to the "value portfolio" worker 155 as well as all other jobs 182-1 to 182-N running on all other node computers 800-1 to 800-N within a particular service. Then, according to the "value portfolio" worker 155, one thousand separate descendant jobs 182-1 to 182-1000 named, for example, "value instrument no. 1," "value instrument no. 2," etc., are divided out and sent to the scheduler 600 for assignment to an available node computer 800 within the service. The one thousand descendant jobs 182-1 to 182-1000 may each be sent to and processed on available node computers 800-1 to 800-N. During processing, each of the descendant jobs 182-1 to 182-1000 has access to the market environment results computed earlier and stored in the global cache 900. As a result, the descendant jobs 182-1 to 182-1000 may not need to perform the yield curve computation themselves and may not need to contact the calling application 180 for such information, but rather, can more quickly obtain the results of the yield curve computation stored in the global cache 900. Upon completion of each of the one thousand descendant jobs 182-1 to 182-1000, the "value portfolio" job 182 aggregates the outputs from the "value instrument" jobs 182-1 to 182-1000 for further computation of a portfolio value result.

H. Method of Troubleshooting/Debugging One Embodiment of a System

One embodiment of the system 10 also has additional functionality that may allow a worker 155 to be deployed on a local computer 100 without accessing the compute backbone 300 infrastructure or the network 200. To allow an applications developer 30 to debug its worker modules 195-1 to 195-N locally on its local computer 100 (which, in one embodiment, is the development host for the applications developer 30), the compute backbone 300 is capable of (i) providing a simplified replica of itself, including an API 190, and (ii) initializing worker modules 195-1 to 195-N in the same process space in which the calling application 180 resides. Such a capability may enable an applications developer 30 to debug functionality, such as persistence and parameter passing, in an environment where the developer 30 has access to all necessary information about both the calling application 180 and the environment on which it is running (i.e., the replicated functionality of the compute backbone 300). For example, if a worker module 195 performs properly on the local computer 100, it will also perform properly when deployed on the compute backbone 300.

Figure 11:
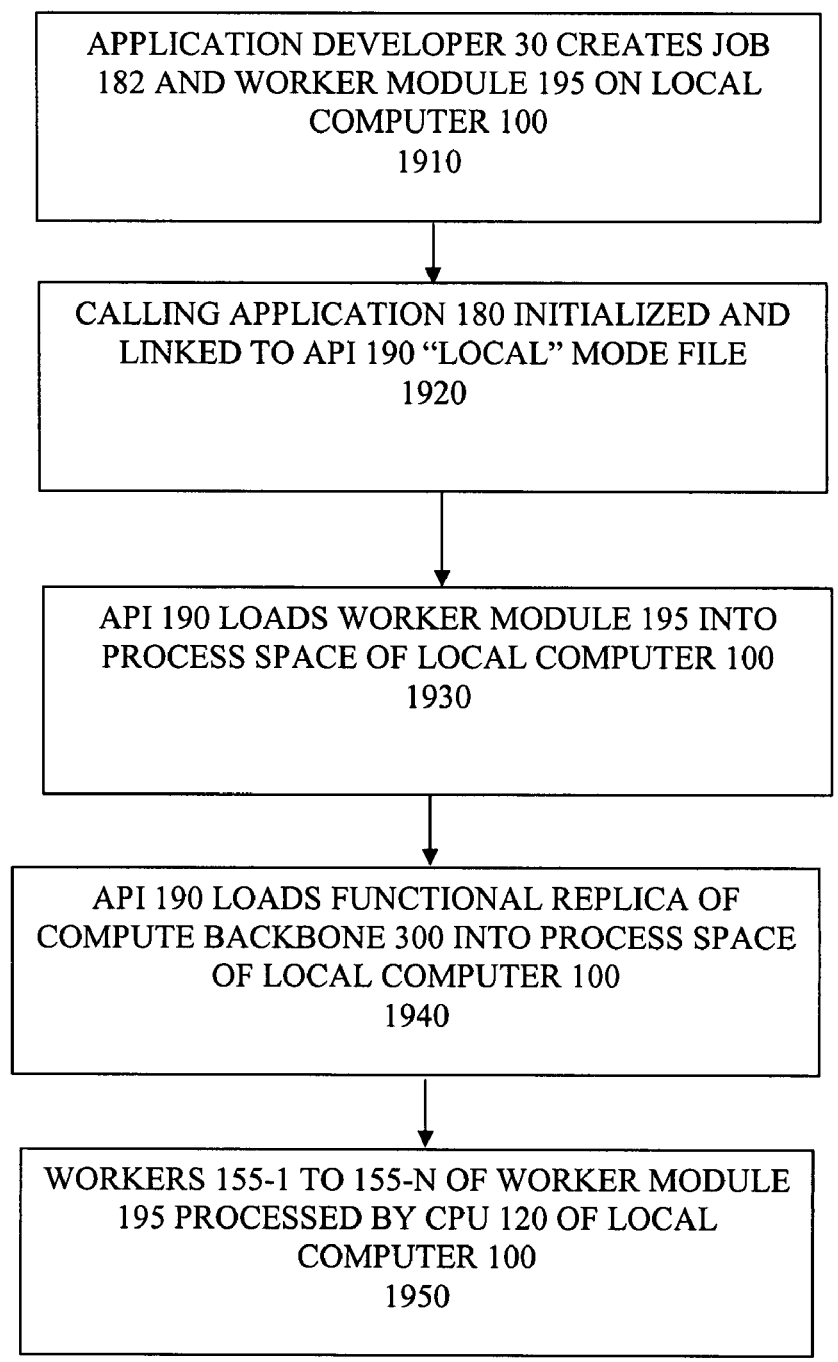
FIG. 11 illustrates one embodiment of a method of debugging using the system 10 shown in FIG. 2.

FIG. 11 illustrates certain operations performed in one embodiment of a method of running a calling application 180 in local mode. For any particular calling application 180, an applications developer 30 may create both a worker module 195 and one or more jobs 182 (step 1910). At initialization, the developer 30 links the calling application 180 to the API 190 file associated with local mode operation (as opposed to the API 190 file associated with network mode operation) (step 1920). The API 190 then loads the worker module 195 into the process space of the local computer 100 (step 1930). The API 190 ensures that a replica of all major functions performed by the compute backbone 300 (e.g., scheduling, caching, etc.) are loaded into the data storage devices 110-1 to 110-N of the local computer 100 (step 1940). The worker 155 is then processed on the CPU 120 of the local computer 100 (step 1950). Unlike the parallel computing operation of network mode on the actual compute backbone 300 infrastructure, processing in local mode is accomplished sequentially, or perhaps concurrently if multithreading is used.

Although illustrative embodiments and example methods have been shown and described herein in detail, it should be noted and will be appreciated by those skilled in the art that there may be numerous variations and other embodiments which may be equivalent to those explicitly shown and described. For example, the scope of the present invention is not necessarily limited in all cases to execution of the aforementioned steps in the order discussed. Unless otherwise specifically stated, the terms and expressions have been used herein as terms and expressions of description, not of limitation. Accordingly, the invention is not limited by the specific illustrated and described embodiments and examples (or the terms or expressions used to describe them) but only by the scope of appended claims.

We claim:

1. A method, comprising:
   receiving a job for computation by a distributed computing system comprising one or more node computing devices in communication with a cache;
   processing, on one of said node computing devices, said job to create an intermediate result for storage in said cache, wherein said intermediate result comprises data wherein a time required to obtain said data by computation or retrieval from a data storage external to said distributed computer system is at least marginally greater than that of retrieving said intermediate result from said cache;
   storing said intermediate result in said cache; and
   accessing said cache by presenting a lookup function to said cache, wherein said lookup function comprises a key and a compute function configured to produce said intermediate result, wherein said accessing further comprises:
      determining whether said key is found in said cache;
      responsive to determining that said key is not found, computing said compute function to regenerate said intermediate result; and
      preventing a second node computing device from computing said compute function during said computing said compute function to regenerate said intermediate result.

2. The method of claim 1, wherein said storing comprises assigning a key/result pair to said intermediate result.

3. The method of claim 1, wherein said cache comprises a storage area network.

4. The method of claim 1, wherein said cache comprises a plurality of geographically separate devices.

5. The method of claim 1, wherein said cache comprises a database running on a redundant array of independent disks.

6. The method of claim 1, further comprising:
   reassigning said node computing device processing said job;
   scheduling computation of said job on another node computing device; and
   accessing said cache to retrieve said intermediate result for use in computation of said job on said another node computing device.

7. The method of claim 1, wherein said compute function is computed on at least one of said node computing devices other than said node computing device processing said job.

8. The method of claim 1, wherein said receiving comprises receiving said job from an application running on a local computing device.

9. A distributed computing system, comprising:
   one or more node computing devices in communication with a cache;
   means for receiving a job for computation by said distributed computing system;
   means for processing, on one of said node computing devices, said job to create an intermediate result for storage in said cache, wherein said intermediate result comprises data wherein a time required to obtain said data by computation or retrieval from a data storage external to said distributed computer system is at least marginally greater than that of retrieving said intermediate result from said cache;

means for storing said intermediate result in said cache; and means for accessing said cache by presenting a lookup function to said cache, wherein said lookup function comprises a key and a compute function configured to produce said intermediate result, wherein said means for accessing further comprises:

means for determining whether said key is found in said cache;

means for computing said compute function to regenerate said intermediate result in response to a determination that said key is not found; and means for preventing a second node computing device from computing said compute function during said computing said compute function to regenerate said intermediate result.

10. The distributed computing system of claim 9, wherein said means for storing comprises means for assigning a key/result pair to said intermediate result.

11. The distributed computing system of claim 9, wherein said cache comprises a storage area network.

12. The distributed computing system of claim 9, wherein cache comprises a plurality of geographically separate devices.

13. The distributed computing system of claim 9, wherein said cache comprises a database running on a redundant array of independent disks.

14. The distributed computing system of claim 9, further comprising:

means for reassigning said node computing device processing said job;

means for scheduling computation of said job on another node computing device; and means for accessing said cache to retrieve said intermediate result for use in computation of said job on said another node computing device.

15. The distributed computing system of claim 9, wherein said compute function is computed on at least one of said node computing devices other than said node computing device processing said job.

16. The distributed computing system of claim 9, further comprising means for receiving said job from an application running on a local computing device.

* * * * *